US010615396B2

(12) United States Patent
Zeng et al.

(10) Patent No.: US 10,615,396 B2
(45) Date of Patent: Apr. 7, 2020

(54) BATTERY CONNECTION MODULE

(71) Applicant: Molex, LLC, Lisle, IL (US)

(72) Inventors: Shang Xiu Zeng, Chengdu (CN); Kian Heng Lim, Singapore (SG); Yong Lin, Chengdu (CN)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/122,253

(22) Filed: Sep. 5, 2018

(65) Prior Publication Data

US 2019/0081311 A1 Mar. 14, 2019

(30) Foreign Application Priority Data

Sep. 8, 2017 (CN) .......................... 2017 1 0806557
Jul. 10, 2018 (CN) .......................... 2018 1 0751125

(51) Int. Cl.
| | |
|---|---|
| *H01M 2/20* | (2006.01) |
| *H01M 10/42* | (2006.01) |
| *H01R 12/77* | (2011.01) |
| *H01R 13/73* | (2006.01) |
| *H01R 13/516* | (2006.01) |
| *H01R 107/00* | (2006.01) |

(52) U.S. Cl.
CPC ......... *H01M 2/206* (2013.01); *H01M 10/425* (2013.01); *H01R 12/774* (2013.01); *H01M 2010/4271* (2013.01); *H01R 13/516* (2013.01); *H01R 13/73* (2013.01); *H01R 2107/00* (2013.01)

(58) Field of Classification Search
CPC .. H01M 2/206; H01M 10/425; H01R 12/774; H01R 13/516

USPC ........................................................ 439/77
See application file for complete search history.

(56) References Cited

U.S. PATENT DOCUMENTS

| | | | | |
|---|---|---|---|---|
| 7,077,704 B2* | 7/2006 | Ikeda | .................... | H01M 2/206 439/251 |
| 7,604,507 B1* | 10/2009 | Millon | .................. | H01M 2/206 439/627 |

(Continued)

FOREIGN PATENT DOCUMENTS

| | | |
|---|---|---|
| JP | H03-103484 U | 10/1991 |
| JP | 2011-076936 A | 4/2011 |

OTHER PUBLICATIONS

Office Action received for Japanese Patent Application No. 2018-167574, dated Aug. 20, 2019, 8 pages. (4 ages of English Translation and 4 pages of Official Copy).

*Primary Examiner* — Alexander Gilman
(74) *Attorney, Agent, or Firm* — Molex, LLC

(57) ABSTRACT

A battery connection module comprises a carrying tray, a plurality of busbars and a circuit unit. The carrying tray has a first edge and a second edge positioned at two opposite sides and two end edges. The circuit unit comprises a flexible circuit piece and a connector, the flexible circuit piece has a main body and a mounting bar extending from the main body, the mounting bar has a connecting portion extending from the main body, a bendable portion extending from the connecting portion and a connector mounting portion connected to a distal end of the bendable portion, the connector is provided on the connector mounting portion and has a mating end. The bendable portion is operable to allow the connector to be positioned at positions where the mating end faces different directions.

34 Claims, 44 Drawing Sheets

(56) References Cited

U.S. PATENT DOCUMENTS

| | | | | |
|---|---|---|---|---|
| 8,449,333 B2* | 5/2013 | Ikeda | H01M 2/1061 | 439/627 |
| 8,999,552 B2* | 4/2015 | Ogasawara | H01R 9/226 | 429/121 |
| 9,023,499 B2* | 5/2015 | Takase | H01M 2/1077 | 429/90 |
| 9,083,098 B2* | 7/2015 | Nakayama | H01M 2/20 | |
| 9,184,432 B2* | 11/2015 | Nakayama | H01M 2/206 | |
| 9,214,752 B2* | 12/2015 | Liu | H01M 2/202 | |
| 9,331,319 B2* | 5/2016 | Ikeda | H01M 2/1077 | |
| 9,520,587 B2* | 12/2016 | DeKeuster | H01M 2/206 | |
| 10,333,236 B2* | 6/2019 | Okamoto | H01R 11/288 | |
| 2002/0086578 A1* | 7/2002 | Ikeda | H01M 2/1077 | 439/500 |
| 2011/0008669 A1* | 1/2011 | Ogasawara | H01M 2/1072 | 429/160 |
| 2012/0183833 A1* | 7/2012 | Ikeda | H01M 2/1077 | 429/121 |
| 2012/0231638 A1* | 9/2012 | Ikeda | H01M 2/1077 | 439/77 |
| 2013/0010449 A1* | 1/2013 | Ikeda | H02G 3/0437 | 361/826 |
| 2013/0171495 A1* | 7/2013 | Ogasawara | H01M 2/1077 | 429/121 |
| 2014/0017553 A1* | 1/2014 | Kikuchi | H01M 2/206 | 429/159 |
| 2014/0311768 A1* | 10/2014 | Takishita | H01R 13/447 | 174/66 |
| 2015/0024634 A1* | 1/2015 | Nakayama | H01M 2/206 | 439/627 |
| 2015/0372465 A1* | 12/2015 | Nakayama | H01M 2/206 | 174/74 R |
| 2016/0043446 A1* | 2/2016 | Fritz | H01M 10/425 | 429/90 |
| 2016/0049703 A1 | 2/2016 | Lobert et al. | | |
| 2017/0328783 A1* | 11/2017 | Okamoto | G01K 1/14 | |
| 2017/0352859 A1* | 12/2017 | Okamoto | H01M 2/34 | |
| 2019/0081311 A1* | 3/2019 | Zeng | H01M 2/206 | |

* cited by examiner

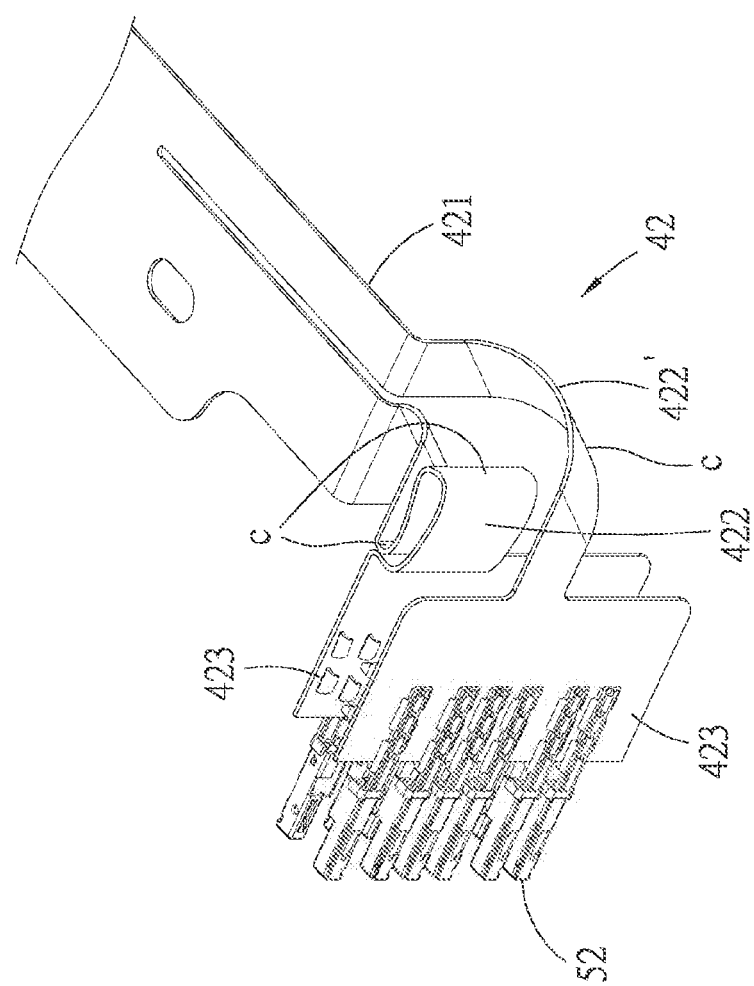
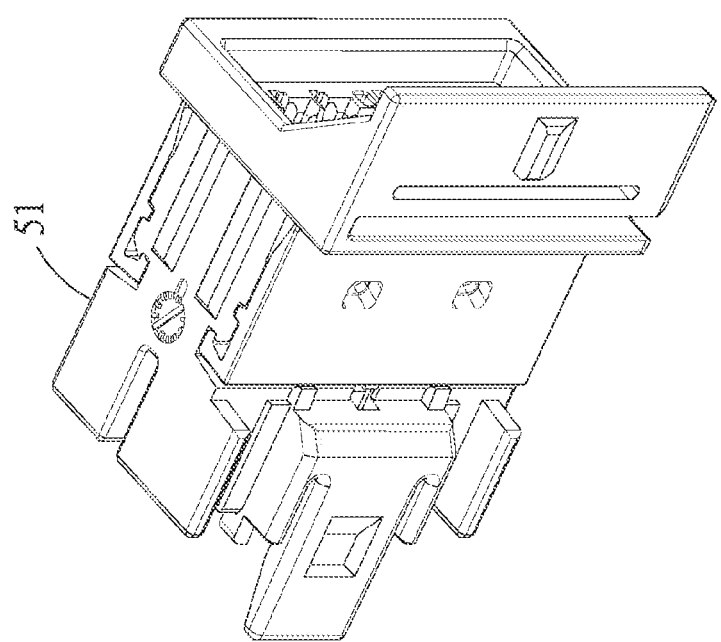
FIG. 42

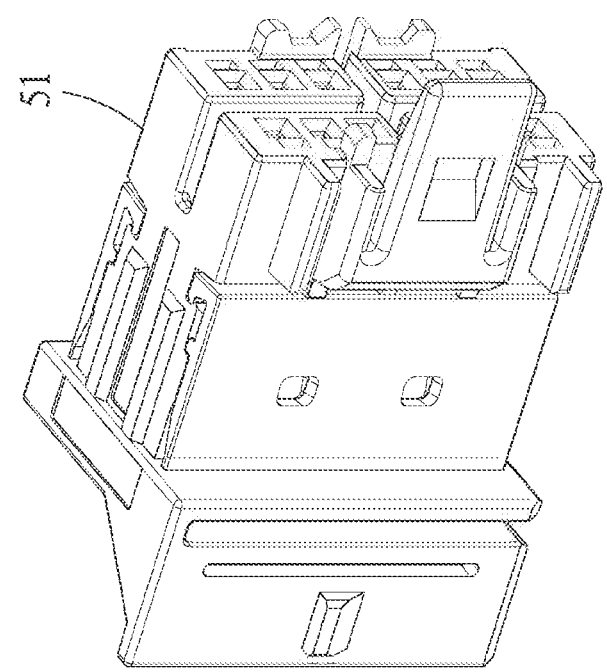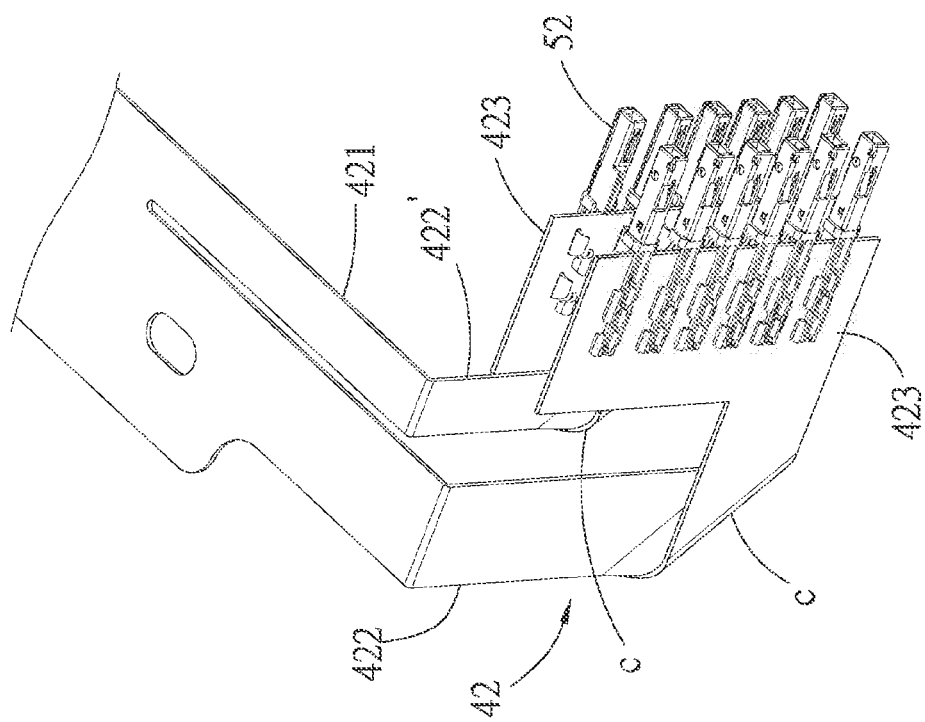
FIG. 43

BATTERY CONNECTION MODULE

RELATED APPLICATIONS

This application claims priority to Chinese Application No. 201710806557.8, filed Sep. 8, 2017, and Chinese Application No. 201810751125.6, filed Jul. 10, 2018, both of which are incorporated herein by reference in their entirety.

TECHNICAL FIELD

The present disclosure relates to a battery connection module, and particularly to a battery connection module which is used to connect rechargeable batteries in series for high power output.

BACKGROUND ART

A battery system, in which a plurality of electrochemical rechargeable batteries, such as batteries for a vehicle, are arranged side by side to form a battery pack generally, generally connects the batteries in series by a battery connection module to form a pair of output electrodes, and the battery connection module is also provided with a control circuit to connect a Battery Management System (abbreviated as BMS).

For example, Chinese patent application publication No. CN105144463A (corresponding to US2016/0043446) discloses a battery contact system for an electrochemical device, which comprises a monitoring unit, and the monitoring unit comprises a signal terminal connector for connecting a connection line to a monitoring unit of another battery contact system or to a central monitoring device. The signal terminal connector is fixed on a printed circuit board, can only be mated with a cable connector from one constant mating direction, if the mating direction of the signal terminal connector is desired to change, the printed circuit board, a carrying assembly and a cover assembly must be remanufactured. Secondly, the signal terminal connector is only covered by the cover assembly, and there is no structure for providing sufficient fixing for the signal terminal connector, so when the signal terminal connector is inserted or pulled out, it easily causes the signal terminal connector to be damaged, and may even causes the printed circuit board to be pulled and damage the printed circuit board or a connecting configuration with the printed circuit board.

SUMMARY

Therefore, one of the objects of the present disclosure is to provide a battery connection module having a connector which can change mating directions at two positions.

Therefore, another object of the present disclosure is to provide a battery connection module having a connector which is fixed by a fixing configuration.

Thus, in some embodiments, a battery connection module of the present disclosure is adapted to connect a battery pack, the battery connection module comprises a carrying tray, a plurality of busbars and a circuit unit. The carrying tray is adapted to be provided on the battery pack and has a first edge and a second edge which are positioned at two opposite sides and two end edges which respectively connect two ends of the first edge and second edge. The plurality of busbars are provided on the carrying tray and are adapted to electrically connect the battery pack. The circuit unit comprises a flexible circuit piece and a connector, the flexible circuit piece is mechanically and electrically connected to each busbar and has a main body and a mounting bar extending from the main body, the mounting bar has a connecting portion extending from the main body at a position corresponding to one of the end edges of the carrying tray and at least one bendable portion extending from the connecting portion, and a distal end of the at least one bendable portion consists of a connector mounting portion, the connector is provided on the connector mounting portion and has a mating end which is adapted to mate with a mating connector, and the bendable portion is operable to allow the connector to be positioned at positions where the mating end faces different directions.

In some embodiments, the bendable portion is operable to allow the connector to be positioned at a first position where the mating end faces the first edge; and the bendable portion is operable to allow the connector to be positioned at a second position where the mating end faces the second edge.

In some embodiments, the mounting bar has two bendable portions, the two bendable portions respectively extend from two sides of the connecting portion which respectively correspond to the first edge and the second edge, the two bendable portions are operable to allow the bendable portion which is close to the first edge to form at least two bends and allow the bendable portion which is close to the second edge to form at least one bend, so as to allow the connector to be positioned at the first position; the two bendable portions are operable to allow the bendable portion which is close to the first edge to form at least one bend and allow the bendable portion which is close to the second edge to form at least two bends, so as to allow the connector to be positioned at the second position.

In some embodiments, the mounting bar has one bendable portion, the bendable portion extends from a lower end of the connecting portion, the bendable portion is operable to bend toward the first edge to form at least one bend so as to allow the connector to be positioned at the first position; the bendable portion is operable to bend toward the second edge to form at least one bend so as to allow the connector to be positioned at the second position.

In some embodiments, the bendable portion is operable to bend at an angle of 45 degrees toward the first edge to form one bend so as to allow the connector to be positioned at the first position; the bendable portion is operable to bend at an angle of 45 degrees toward the second edge to form one bend so as to allow the connector to be positioned at the second position.

In some embodiments, the connector mounting portion is formed by a first mounting section connecting with the bendable portion, a second mounting section arranged side by side with the first mounting section and a connecting section curvedly connected between the first mounting section and the second mounting section.

In some embodiments, the mounting bar has one bendable portion, the bendable portion extends sideward from a side of the connecting portion corresponding to the first edge, the bendable portion is operable to form at least two bends so as to allow the connector to be positioned at the first position; the bendable portion is operable to form at least one bend so as to allow the connector to be positioned at the second position.

In some embodiments, the connector mounting portion is formed by a first mounting section connecting with the bendable portion, a second mounting section arranged side by side with the first mounting section and a connecting section curvedly connected between the first mounting section and the second mounting section.

In some embodiments, the distal end of the bendable portion is layered to form two connector mounting portions arranged side by side with each other.

In some embodiments, the mounting bar has one bendable portion, the bendable portion extends sideward from a side of the connecting portion corresponding to the second edge, the bendable portion is operable to form at least one bend so as to allow the connector to be positioned at the first position; the bendable portion does not turn and bend to allow the connector to be positioned at the second position.

In some embodiments, the bendable portion is operable to turn once toward the first edge and pass through an outer side of the connecting portion with respect to the carrying tray so as to allow the connector to be positioned at the first position.

In some embodiments, the bendable portion is operable to turn once toward the first edge and pass through an inner side of the connecting portion with respect to the carrying tray so as to allow the connector to be positioned at the first position.

In some embodiments, the connector mounting portion is formed by a first mounting section connecting with the bendable portion, a second mounting section arranged side by side with the first mounting section and a connecting section curvedly connected between the first mounting section and the second mounting section.

In some embodiments, the connecting portion has a cutout, the mounting bar has two bendable portions, the two bendable portions respectively bend from two sides of the connecting portion respectively corresponding to the first edge and the second edge toward an inner side of the connecting portion with respect to the carrying tray, then extend in facing each other, then bend toward an outer side of the connecting portion with respect to the carrying tray, merge and pass through the cutout; the merged region of the two bendable portions is operable to form at least one bend so as to allow the connector to be positioned at the first position; the merged region of the two bendable portions is operable to form at least one bend so as to allow the connector to be positioned at the second position.

In some embodiments, the two bendable portions are further separated at a distal end of the merged region to form two connector mounting portions.

In some embodiments, the mounting bar has two bendable portions, the two bendable portions are spaced apart from each other and extend from the same side of the connecting portion corresponding to the first edge, and the connecting portion forms one bend so that the two bendable portions face each other side by side; the two bendable portions each are operable to form at least two bends so as to allow the connector to be positioned at the first position; the two bendable portion each are operable to form at least one bend so as to allow the connector to be positioned at the second position.

In some embodiments, the mounting bar has two bendable portions, the connecting portion is cut into two parts along an extending direction and the two bendable portions respectively extend from distal ends of the two parts of the connecting portion, one of the two bendable portions which is close to the first edge is defined as a first bendable portion, the other of the two bendable portions which is close to the second edge is defined as a second bendable portion; the first bendable portion is operable to form at least one bend and the second bendable portion is operable to form at least one bend so as to allow the connector to be positioned at the first position; the first bendable portion is operable to form at least one bend and the second bendable portion is operable to format least one bend so as to allow the connector to be positioned at the second position.

In some embodiments, the connector comprises an insulating housing and a plurality of terminals provided to the insulating housing, the plurality of terminals are connected to the connector mounting portion of the mounting bar, the connector further comprises an outer casing sheathed on the insulating housing.

In some embodiments, the carrying tray further has a seat body for accommodating the connector and the mounting bar.

In some embodiments, the seat body has a first sideward opening toward the first edge so as to allow the connector to be positioned at the first position and a second sideward opening toward the second edge so as to allow the connector to be positioned at the second position.

In some embodiments, the connector comprises an insulating housing, the insulating housing of the connector has a first latching structure, the seat body has a second latching structure for latching and fixing with the first latching structure.

In some embodiments, the insulating housing further has a bottom surface, the first latching structure is formed on the bottom surface, the seat body further has a connecting wall extending downwardly from the end edge of the carrying tray, a position-limiting wall spaced apart from and facing the connecting wall, a bottom wall connected between a lower edge of the connecting wall and a lower edge of the position-limiting wall, the second latching structure is formed on the bottom wall.

In some embodiments, the second latching structure is formed by two protruding rails spaced apart from each other, each of the two protruding rails has a rib portion extending parallel to the end edge of the carrying tray, an upper stopping portion extending from the rib portion toward a direction away from the other protruding rail and spaced apart from the bottom wall and a latching block extending from the rib portion toward the other protruding rail, and one of the latching blocks of the two protruding rails is close to the first edge so as to allow the connector to latch when the connector is positioned at the first position, and the other of the latching blocks of the two protruding rails is close to the second edge so as to allow the connector to latch when the connector is positioned at the second position, the first latching structure is formed by two sliding rails spaced apart from each other in parallel and a hook portion positioned between the two sliding rails to cooperatively latch with one of the latching blocks, each of facing sides of the two sliding rails is formed with a position-limiting groove closed at one end to cooperatively accommodate the upper stopping portion of the corresponding protruding rail.

In some embodiments, the battery connection module further comprises an upper cover, the upper cover has a main cover which covers the carrying tray and a side cover which is connected to the main cover and covers the seat body.

In some embodiments, the side cover has at least one latching hook, and the position-limiting wall of the seat body is formed with at least one latching hole to allow the at least one latching hook to latch therewith.

In some embodiments, the connector comprises an insulating housing, the insulating housing of the connector has a bottom surface, the bottom surface has a first latching structure for latching and fixing with a second latching structure which is formed on a side wall top surface of a box body of the battery pack.

In some embodiments, the second latching structure is formed by two protruding rails spaced apart from each other, each protruding rail has a rib portion extending parallel to the end edge of the carrying tray, an upper stopping portion extending from the rib portion 1261 toward a direction away from the other protruding rail and spaced apart from the side wall top surface and a latching block extending from the rib portion toward the other protruding rail, and one of the latching blocks of the two protruding rails is close to the first edge so as to allow the connector to latch when the connector is positioned at the first position, and the other of the latching blocks of the two protruding rails is close to the second edge so as to allow the connector to latch when the connector is positioned at the second position, the first latching structure is formed by two sliding rails spaced apart from each other in parallel and a hook portion positioned between the two sliding rails to cooperatively latch with one of the latching blocks, each of facing sides of the two sliding rails is formed with a position-limiting groove closed at one end to cooperatively accommodate the upper stopping portion of the corresponding protruding rail.

In some embodiments, the battery connection module further comprises an upper cover, the upper cover has a main cover which covers the carrying tray and a side cover connected to the main cover, the side cover at least covers the mounting bar connected to a rear end of the connector.

In some embodiments, the carrying tray has a plurality of mounting grooves respectively accommodating the plurality of busbars, and each mounting groove is defined by a bottom wall and a groove side wall, the groove side wall is provided with an alignment key protruding into the mounting groove, each busbar has an alignment cutout cooperating with the alignment key in the corresponding mounting groove.

In some embodiments, each groove side wall has a first side wall portion and a second side wall portion which face each other, and the alignment key is provided on the first side wall portion, the first side wall portion is further provided with at least one latching hook, the second side wall portion is provided with a plurality of lower stopping blocks positioned at a first height and a plurality of upper stopping blocks positioned at a second height, one side of the busbar is positioned between the plurality of upper stopping blocks and the plurality of lower stopping blocks and a height difference between the second height and the first height is greater than a thickness of the busbar, the groove bottom wall is provided with a plurality of support blocks, the top ends of plurality of support blocks have the same height as top ends of the plurality of lower stopping blocks, the plurality of lower stopping blocks and the plurality of support blocks are cooperatively support the busbar, the plurality of upper stopping blocks and the at least one latching hook cooperatively limit the busbar in position.

The present disclosure at least has the following effects: because the mounting bar of the flexible circuit piece has the bendable portion which is operable to allow the operator to flexibly select that the connector is positioned at the first position or the second position opposite to the first position to meet the use requirements, therefore, it is possible to save the cost of separately manufacturing the mold for the connector at different positions and the cost of the product inventory.

Furthermore, the connector can be fixed to one end of the carrying tray by that the first latching structure and the second latching structure are latched with each other, so that the configuration of the entire battery connection module is more compact, the integration is better, and it facilitates that the mating connector is mated with the connector, and it can avoid damage to the flexible circuit piece because the flexible circuit piece is pulled when the connector is inserted or pulled out.

Furthermore, by that the side cover of the upper cover at least covers the mounting bar and the connection between the mounting bar and the connector, the mounting bar and the connection between the mounting bar and the connector can be protected from damage.

BRIEF DESCRIPTION OF THE DRAWINGS

Other features and effects of the present disclosure will be apparent from the embodiments with reference to figures, in which:

FIG. 42 is an incomplete exploded perspective view of the eleventh embodiment and illustrates the bending state of the mounting bar of the flexible circuit piece when the connector is in the first position;

FIG. 43 is an incomplete exploded perspective view of the eleventh embodiment and illustrates the bending state of the mounting bar of the flexible circuit piece when the connector is in the second position.

DETAILED DESCRIPTION OF THE PREFERRED EMBODIMENTS

Figure 1:
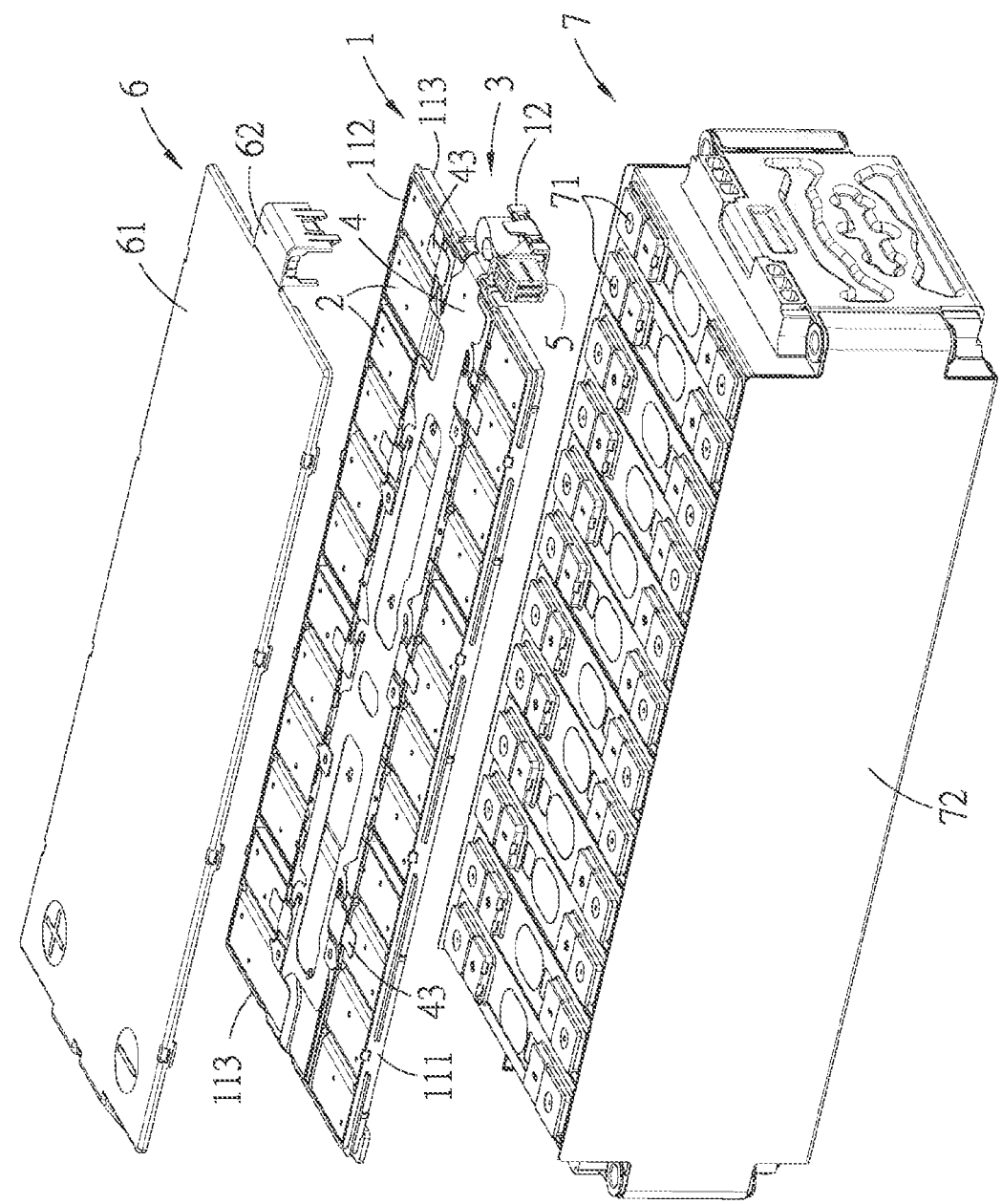
FIG. 1 is an exploded perspective view of a first embodiment of a battery connection module of the present disclosure and a battery pack.
Figure 2:
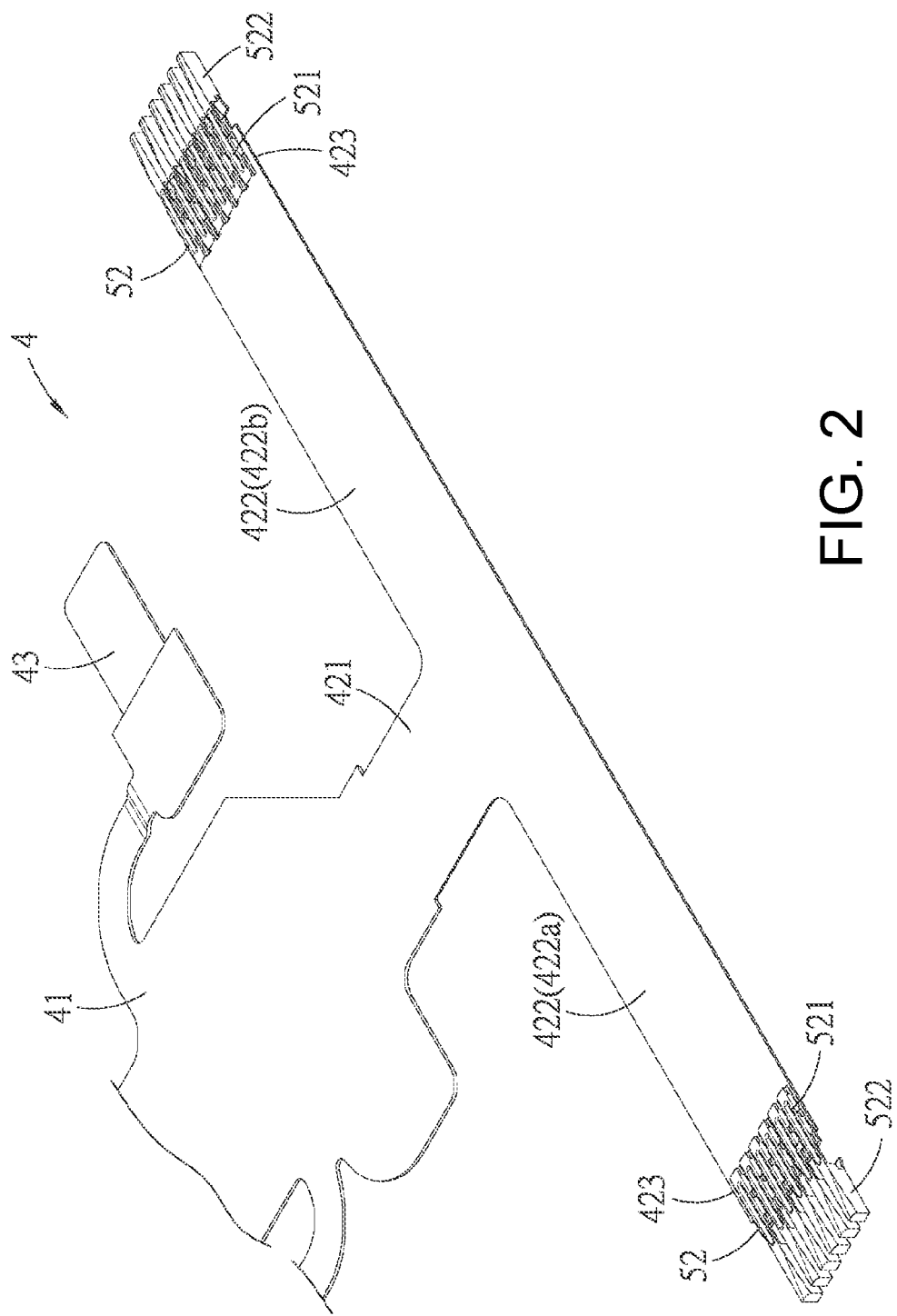
FIG. 2 is a perspective view of an unfolded flexible circuit piece and terminals of the first embodiment.

Before the present disclosure is described in detail, it should be noted that in the following description, similar components are represented by the same reference numerals.

Referring to FIG. 1, a first embodiment of a battery connection module of the present disclosure is adapted to connect a battery pack 7. The battery pack 7 comprises a plurality of batteries 71 and a box body 72 accommodating the plurality of batteries 71. The battery connection module comprises a carrying tray 1, a plurality of busbars 2, a circuit unit 3 and a upper cover 6. The carrying tray 1 is adapted to be provided on the battery pack 7 and is made of an insulating material. In the first embodiment, the carrying tray 1 has a first edge 111 and a second edge 112 which are positioned at two opposite sides and two end edges 113 which respectively connect two ends of the first and second edge 111, 112, and the carrying tray 1 further has a seat body 12 connected to one of the two end edges 113. The plurality of busbars 2 are provided on the carrying tray 1 and are adapted to electrically connect the batteries 71 of the battery pack 7.

Figure 3:
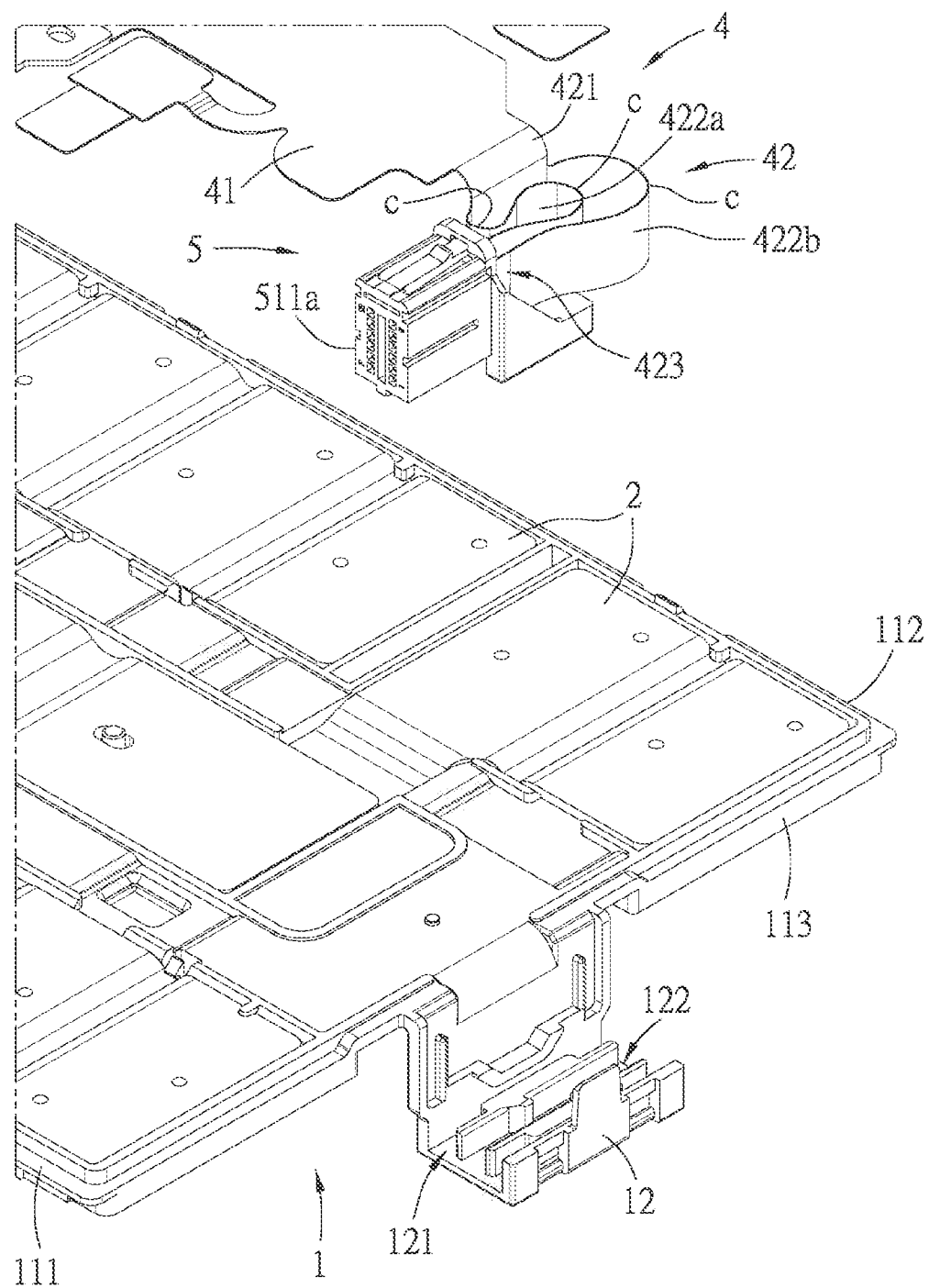
FIG. 3 is an exploded perspective view of the battery connection module and a connector of the first embodiment at a first position.
Figure 4:
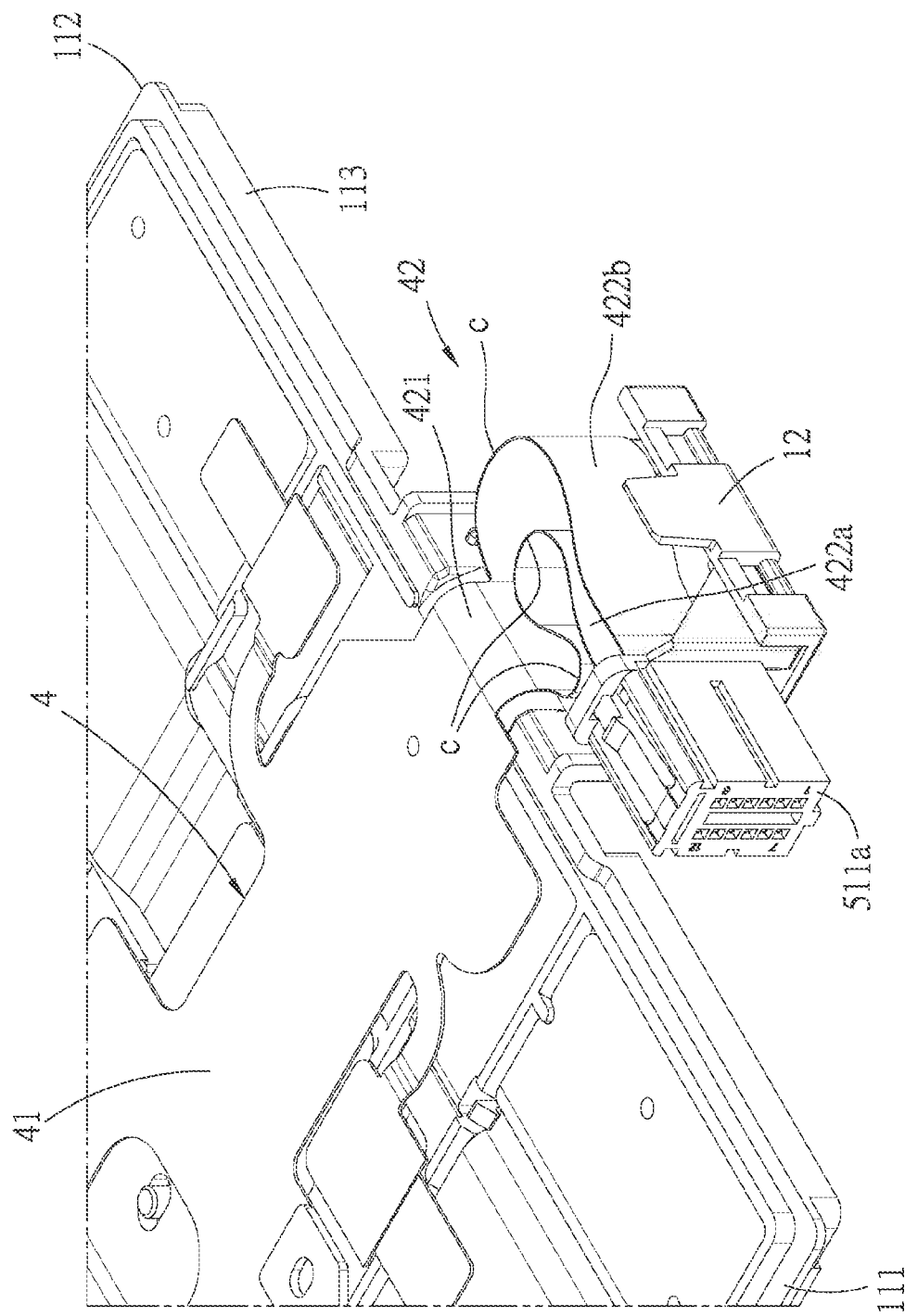
FIG. 4 is a perspective view of the battery connection module and the connector of the first embodiment assembled at the first position.
Figure 5:
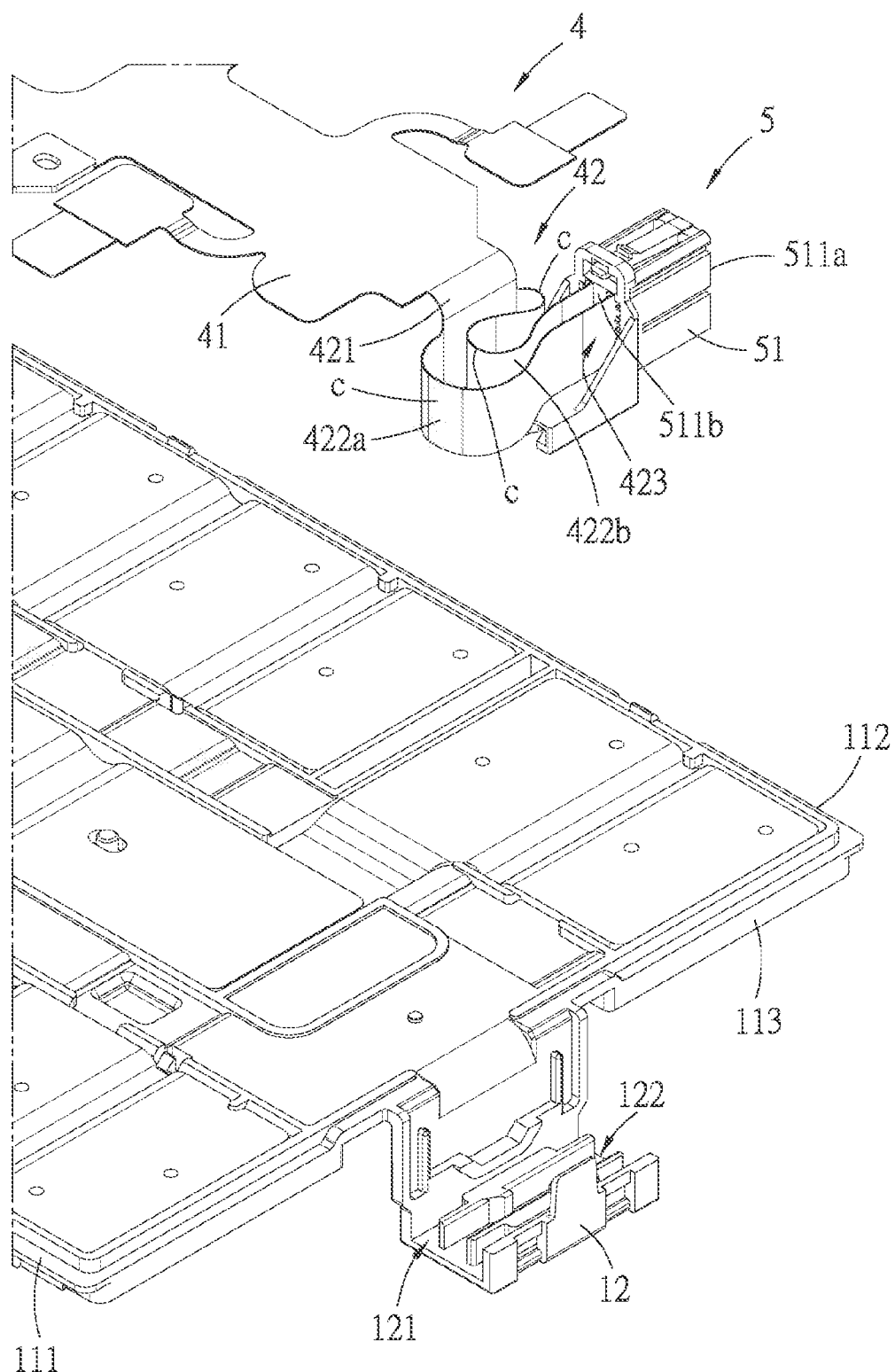
FIG. 5 is an exploded perspective view of the battery connection module and connector of the first embodiment at a second position.
Figure 6:
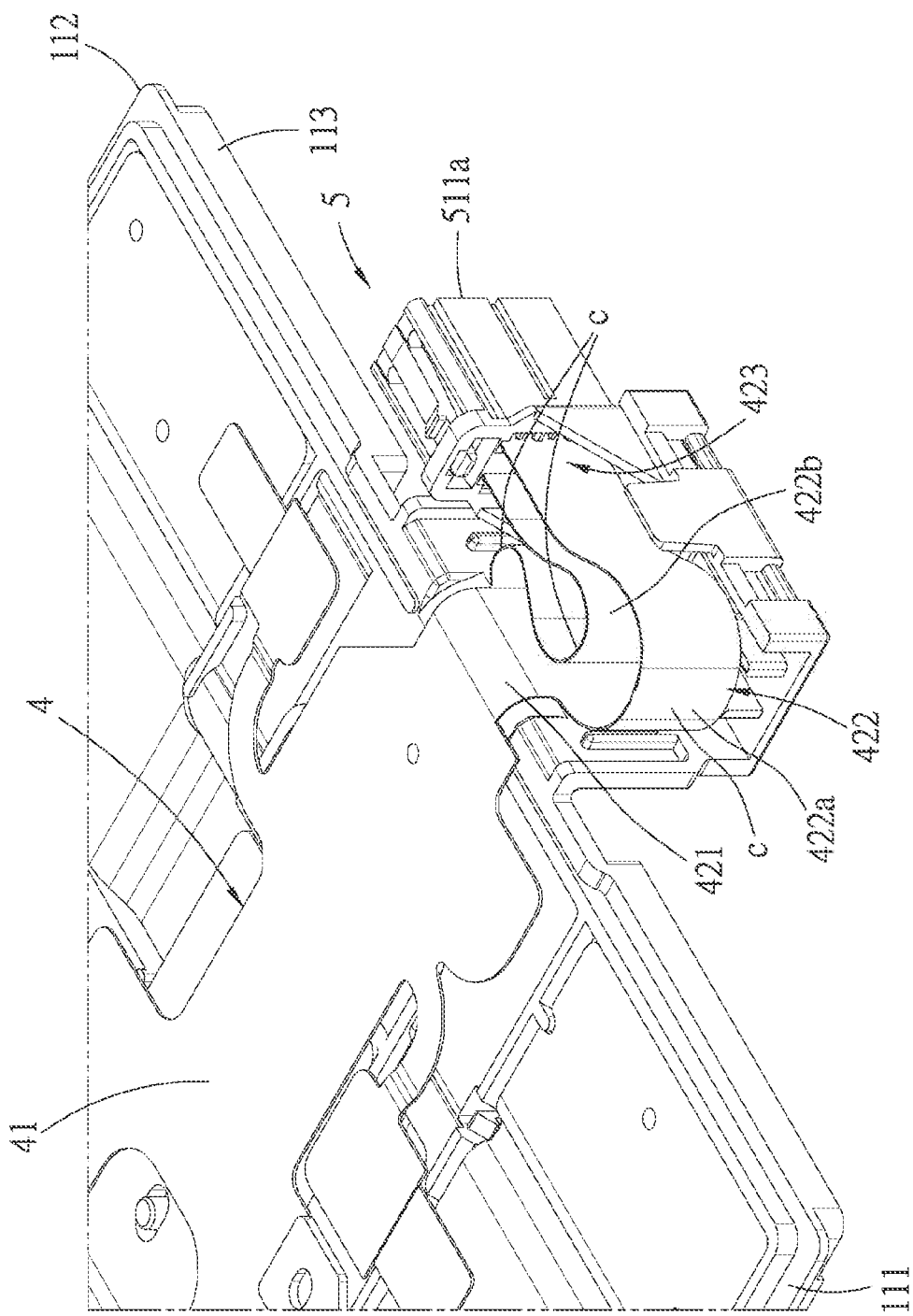
FIG. 6 is a perspective view of the battery connection module and the connector of the first embodiment assembled at the second position.

Referring to FIG. 2 to FIG. 6, the circuit unit 3 comprises a flexible circuit piece 4 and a connector 5. The flexible circuit piece 4 is mechanically and electrically connected to each busbar 2 and has a main body 41 and a mounting bar 42 extending integrally from the main body 41. In the embodiment, the flexible circuit piece 4 is mechanically and electrically connected (such as by welding) to each busbar 2 from the main body 41 via a plurality of conductive plates 43, one end of each conductive plate 43 is connected with the busbar 2, the other end of each conductive plate 43 is connected with a conductive line in the main body 41. The flexible circuit piece 4 may be, such as a FFC (flexible flat cable) and a FPC (flexible circuit board). Each conductive line in the main body 41 is gathered and extends to the mounting bar 42, and besides the conductive lines connecting the busbars 2, lines connecting a temperature sensor or conductive lines connecting other components may be included. The mounting bar 42 has a connecting portion 421 bending from the main body 41 at a position corresponding to one of the end edges 113 of the carrying tray 1 and extending downwardly and at least one bendable portion 422 extending from the connecting portion 421, a distal end of the bendable portion 422 consists of a connector mounting portion 423 on which the connector 5 is provided. In the first embodiment, the mounting bar 42 has two bendable portions 422 respectively extending from two sides of the connecting portion 421 which respectively correspond to the first, edge 111 and the second edge 112. The connector 5 comprises an insulating housing 51 and a plurality of terminals 52 provided to the insulating housing 51, each of the plurality of terminals 52 has a tail portion 521 to be fixed to the connector mounting portion 423 at the distal end of the bendable portion 422 and to electrically connected with each conductive line. In an embodiment, each of the tail portions 521 of the plurality of terminals 52 may has a piercing configuration which is configured to pierce and be fixed to the connector mounting portion 423 at the distal end of the mounting bar 42 and in turn make the plurality of terminals 52 electrically connected with the conductive lines of the mounting bar 42, in other embodiments, the configuration in which each of the tail portions 521 of the plurality of terminals 52 is connected with the connector mounting portion 423 and the conductive line may also be changed to other equivalent configurations. In the first embodiment, the mounting bar 42 has two bendable portions 422, therefore the connector mounting portions 423 at the distal ends of the two bendable portions 422 each are provided with a row of terminals 52, and the two bendable portions 422 are bent to make the two connector mounting portions 423 arranged side by side and make the terminals 52 arranged side by side in two rows, and then the terminals 52 are assembled in the insulating housing 51. Specifically, in the first embodiment, the insulating housing 51 has a mating end 511a which is adapted to mate with a mating connector (not shown), a rear end 511b opposite to the mating end 511a and a bottom surface 512. Each of the plurality of terminals 52 further has a contacting portion 522, the plurality of terminals 52 are assembled into the insulating housing 51 from the rear end 511b to allow the connector mounting portion 423 of the mounting bar 42 to be connected to the rear end 511b of the insulating housing 51, that is, the connector 5 is provided on the connector mounting portion 423. For clarity of illustration and description, the two bendable portions 422 are respectively represented as bendable portions 422a, 422b herein. As shown in FIG. 3 and FIG. 4, the two bendable portions 422a, 422b are operable at an outer side of the connecting portion 421 with respect to the carrying tray 1 to allow the bendable portion 422a which is close to the first edge 111 to totally turn twice (that is firstly turn toward the second edge 112 side and then turn toward the first edge 111 side) to form two bends C, to allow the bendable portion 422b which is close to the second edge 112 to turn once toward the first edge 111 side to form one bend C and to allow the bendable portion 422b to be positioned at an outer side of the bendable portion 422a with respect to the carrying tray 1, thereby allowing the two connector mounting portions 423 to extend toward the first edge 111 side, that is, the distal ends of the two bendable portions 422a, 422b together face the first edge 111 side, so that the connector 5 is positioned at a first position where the mating end 511a faces the first edge 111 side (as shown in FIG. 4); referring to FIG. 5 and FIG. 6, or alternatively, the two bendable portions 422a, 422b are operable to allow the bendable portion 422a close to the first edge 111 to turn once toward the second edge 112 side to form one bend C and to allow the bendable portion 422a to be positioned at an outer side of the bendable portion 422b with respect to the carrying tray 1, to allow the bendable portion 422b close to the second edge 112 to totally turn twice (firstly turn toward the first edge 111 side and then turn toward the second edge 112 side) to form two bends C, thereby allowing the connector mounting portion 423 to extend toward the second edge 112 side, that is, the distal ends of the two bendable portions 422a, 422b together face the second edge 112 side, so that the connector 5 is positioned at a second position where the mating end 511a faces the second edge 112 side (as shown in FIG. 6). In the first embodiment, the seat body 12 of the carrying tray 1 has a first sideward opening 121 toward the first edge 111 side so as to allow the connector 5 to be positioned at the first position and a second sideward opening 122 toward the second edge 112 side so as to allow the connector 5 to be positioned at the second position, in this way, the connector 5 can be chose to provide in a manner of being positioned at the first position or at the second position according to the use requirement. When the connector 5 is positioned at the first position, the mating connector close to the first edge 111 side can be conveniently mated, when the connector 5 is positioned at the second position, the mating connector close to the second edge 112 side can be conveniently mated, that is, the connector 5 can be provided on the first position or the second position according to the position of the battery pack 7 to be installed in a device (such as an automobile) and the relative position of an equipment (such as a battery management system) with which the battery pack 7 and the mating connector are connected, which has flexibility in adjustment.

Figure 7:
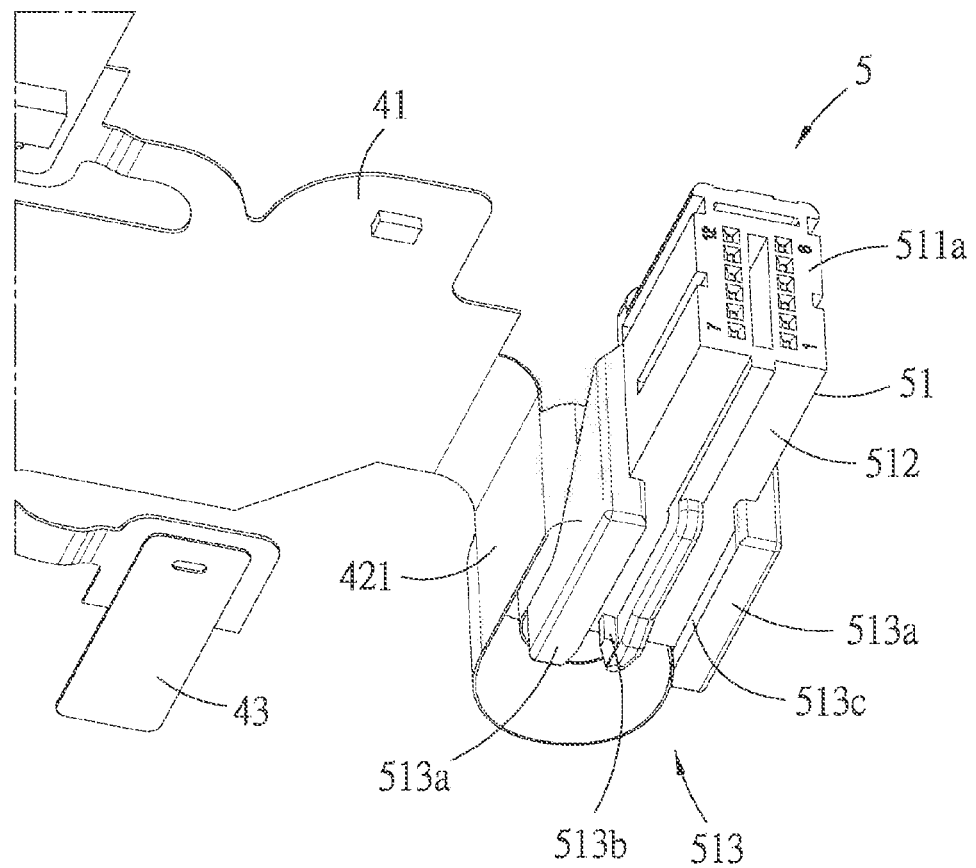
FIG. 7 is an oblique bottom perspective view of the flexible circuit piece and the connector of the first embodiment.
Figure 8:
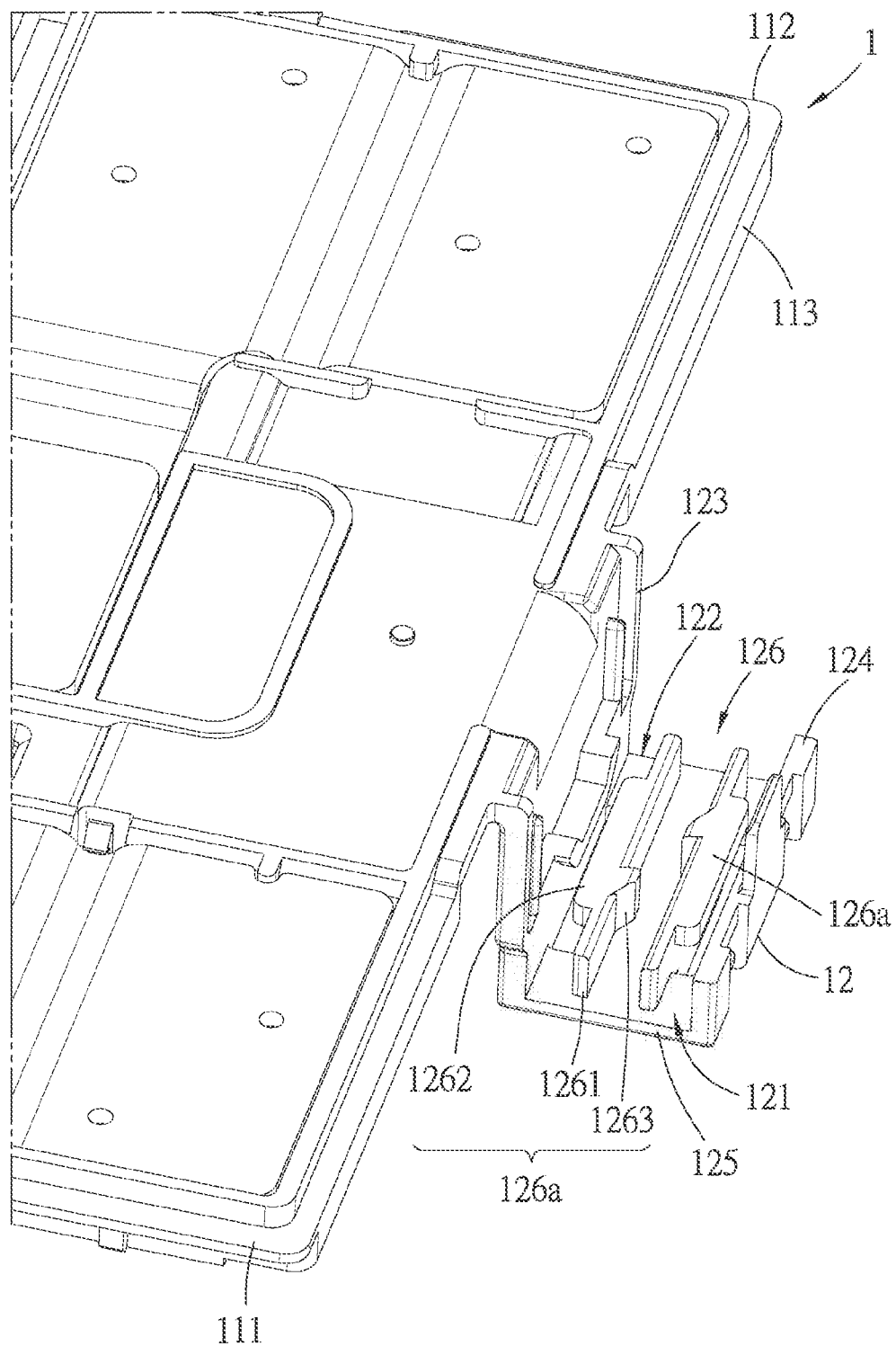
FIG. 8 is a perspective view of a seat body of a carrying tray of the first embodiment.

Referring to FIG. 7 and FIG. 8, in the first embodiment, the insulating housing 51 of the connector 5 further has a first latching structure 513, the first latching structure 513 is formed on a bottom surface 512 of the insulating housing 51. The seat body 12 further has a connecting wall 123 extending downwardly from the end edge 113 of the carrying tray 1, a position-limiting wall 124 spaced apart from and facing the connecting wall 123, a bottom wall 125 connected between a lower edge of the connecting wall 123 and a lower edge of the position-limiting wall 124 and a second latching structure 126 formed on the bottom wall 125 and positioned between the connecting wall 123 and the position-limiting wall 124 for latching and fixing with the first latching structure 513. The second latching structure 126 is formed by two protruding rails 126a spaced apart from each other, each of the two protruding rails 126a has a rib portion 1261 extending parallel to the end edge 113 of the carrying tray 1, an upper stopping portion 1262 extending from the rib portion 1261 toward a direction away from the other protruding rail 126a and spaced apart from the bottom wall 125 and a latching block 1263 extending from the rib portion 1261 toward the other protruding rail 126a, and one of the latching blocks 1263 of the two protruding rails 126a is close to the first edge 111 so as to allow the connector 5 to latch when the connector 5 is positioned at the first position, and the other of the latching blocks 1263 of the two protruding rails 126a is close to the second edge 112 so as to allow the connector 5 to latch when the connector 5 is positioned at the second position. The first latching structure 513 is formed by two sliding rails 513a spaced apart from each other in parallel and a hook portion 513b positioned between the two sliding rails 513a to cooperatively latch with one of the latching blocks 1263, each of the facing sides of the two sliding rails 513a is formed with a position-limiting groove 513c closed at one end to cooperatively accommodate the upper stopping portion 1262 of the corresponding protruding rail 126a. When the connector 5 is to be provided at the first position, the insulating housing 51 of the connector 5 may be placed into the seat body 12 from the first sideward opening 121, open ends of the position-limiting grooves 513c of the two sliding rails 513a are respectively correspondingly inserted by the upper stopping portions 1262 of the two protruding rails 126a and the hook portion 513b slides correspondingly between the two rib portions 1261 until the hook portion 513b passes over the latching block 1263 correspondingly positioned at the hook portion 513b side, the hook portion 513b protrudes toward the left side with respect to the orientation shown in FIG. 7, corresponding to the orientation of FIG. 8, when the connector 5 is inserted from the first sideward opening 121, taking the first sideward opening 121 as the front side relative to the second sideward opening 122, the hook portion 513b correspondingly passes over the latching block 1263 on the left side (i.e., the latching block 1263 positioned on the protruding rail 126a adjacent to the connecting wall 123), then is latched with the rear side of the latching block 1263, at the same time the closed ends of the position-limiting grooves 513c of the two sliding rails 513a respectively abut against front ends of the two upper stopping portions 1262, so as to limit the position of the connector 5 in a front-rear direction, and the two sliding rails 513a and the two protruding rails 126a are inserted with each other to limit the position of the connector 5 in an up-down direction and a left-right direction, so that the connector 5 can be firmly fixed on the seat body 12. Similarly, when the connector 5 is to be provided on the second position, the fixing portion 512 of the connector 5 may be placed into the seat body 12 from the second sideward opening 122, the connector 5 can be fixed in the same manner.

Figure 9:
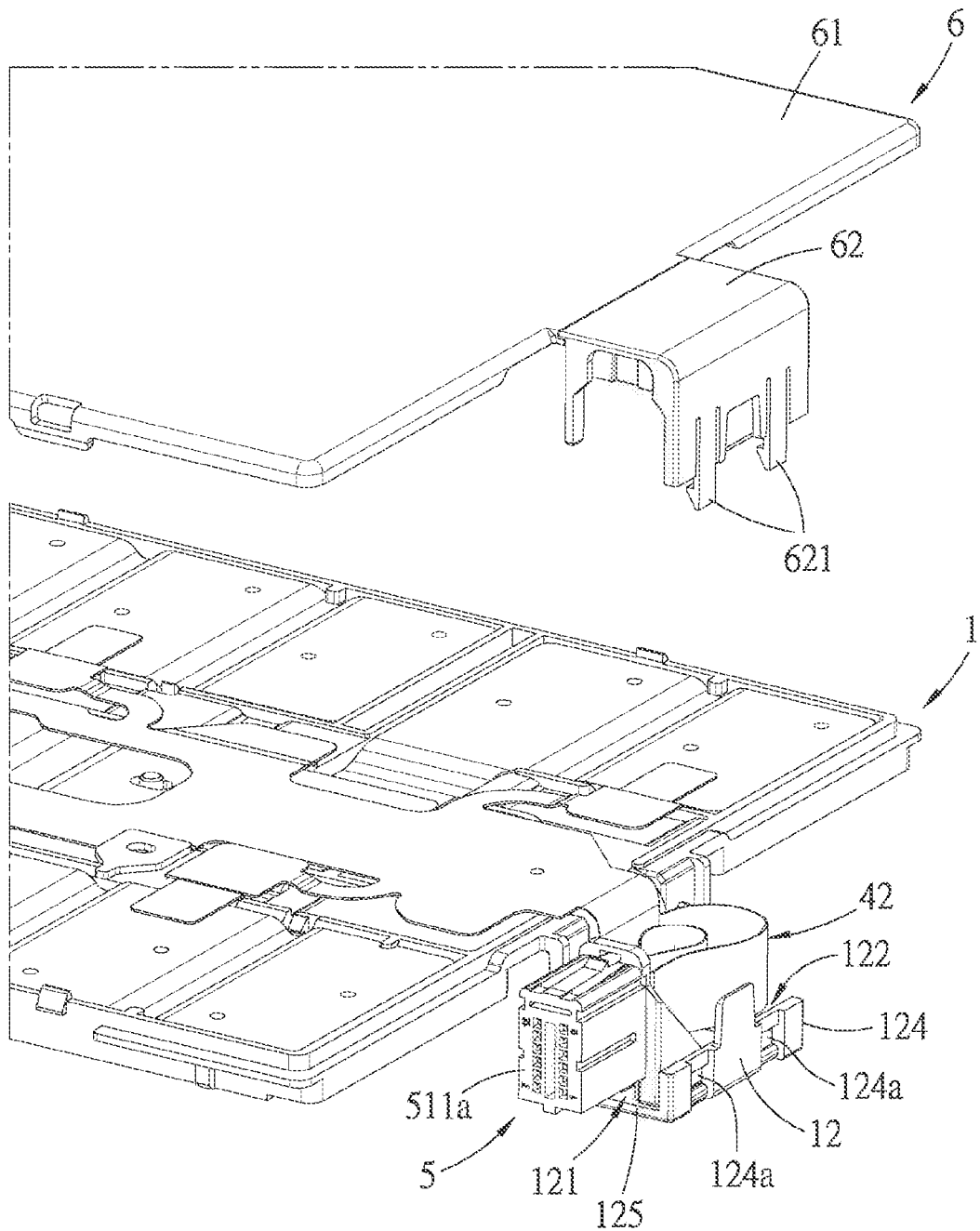
FIG. 9 is an exploded perspective view of the battery connection module of the first embodiment before an upper cover is assembled.
Figure 10:
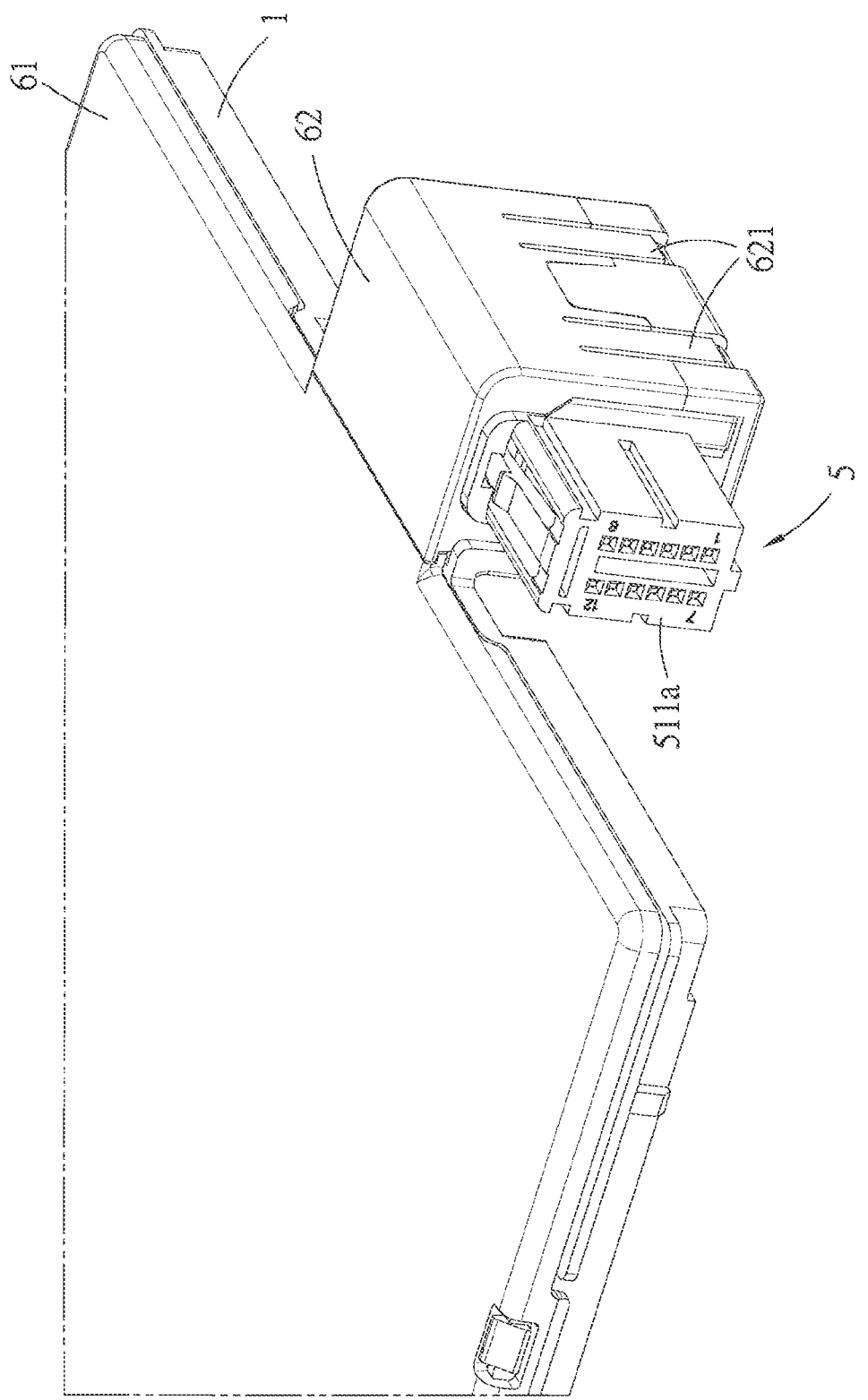
FIG. 10 is a perspective view of the battery connection module of the first embodiment after the upper cover is assembled.

Referring to FIG. 9 and FIG. 10, the upper cover 6 has a main cover 61 which covers the carrying tray 1 and a side cover 62 which is connected to the main cover 61 and covers the seat body 12, the side cover 62 has at least one latching hook 621, and the position-limiting wall 124 of the seat body 12 is formed with at least one latching hole 124a to allow the at least one latching hook 621 to latch therewith. In the first embodiment, the side cover 62 has two latching hooks 621, and the position-limiting wall 124 of the seat body 12 is formed with two latching holes 124a to respectively allow the latching hooks 621 to latch to, so that the side cover 62 covers and is fixed to the seat body 12. The mounting bar 42 and the connection between the mounting bar 42 and the connector 5 can be protected by that the side cover 62 covers the seat body 12.

Figure 11:
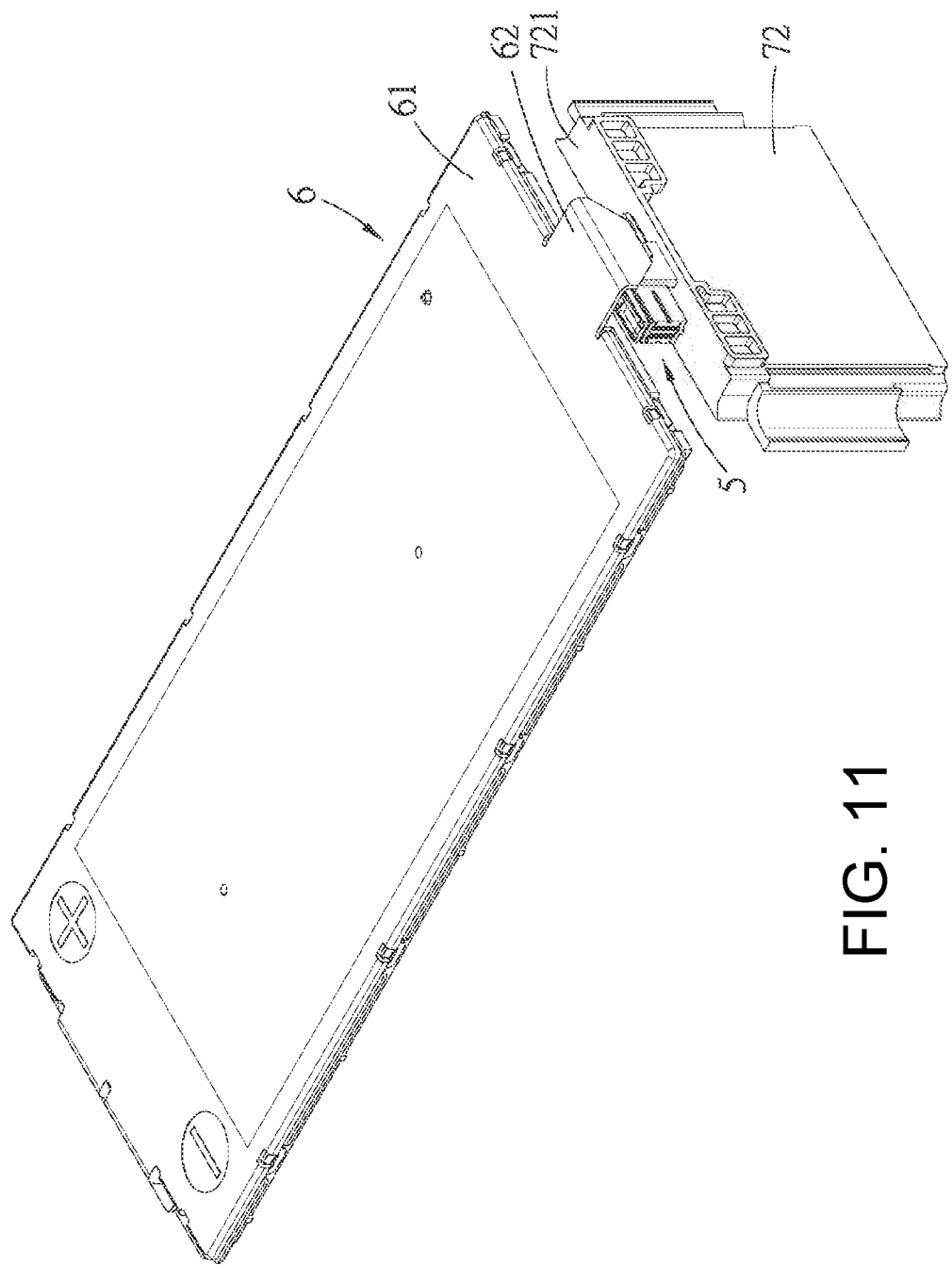
FIG. 11 is a perspective schematic view of a second embodiment of the battery connection module of the present disclosure and a side wall of a box body of the battery pack.
Figure 12:
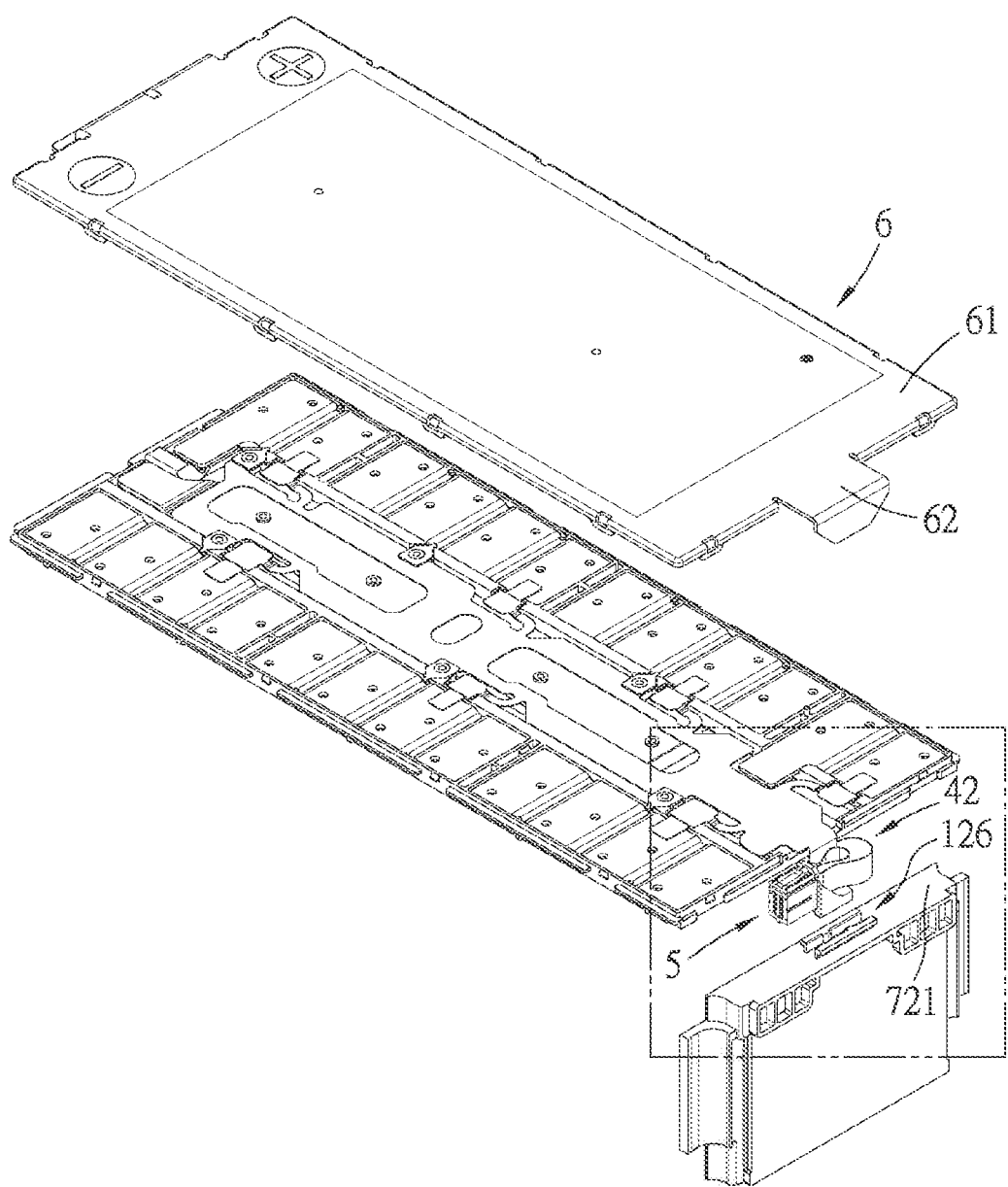
FIG. 12 is an exploded perspective schematic view of the second embodiment and the side wall of the box body of the battery pack.
Figure 13:
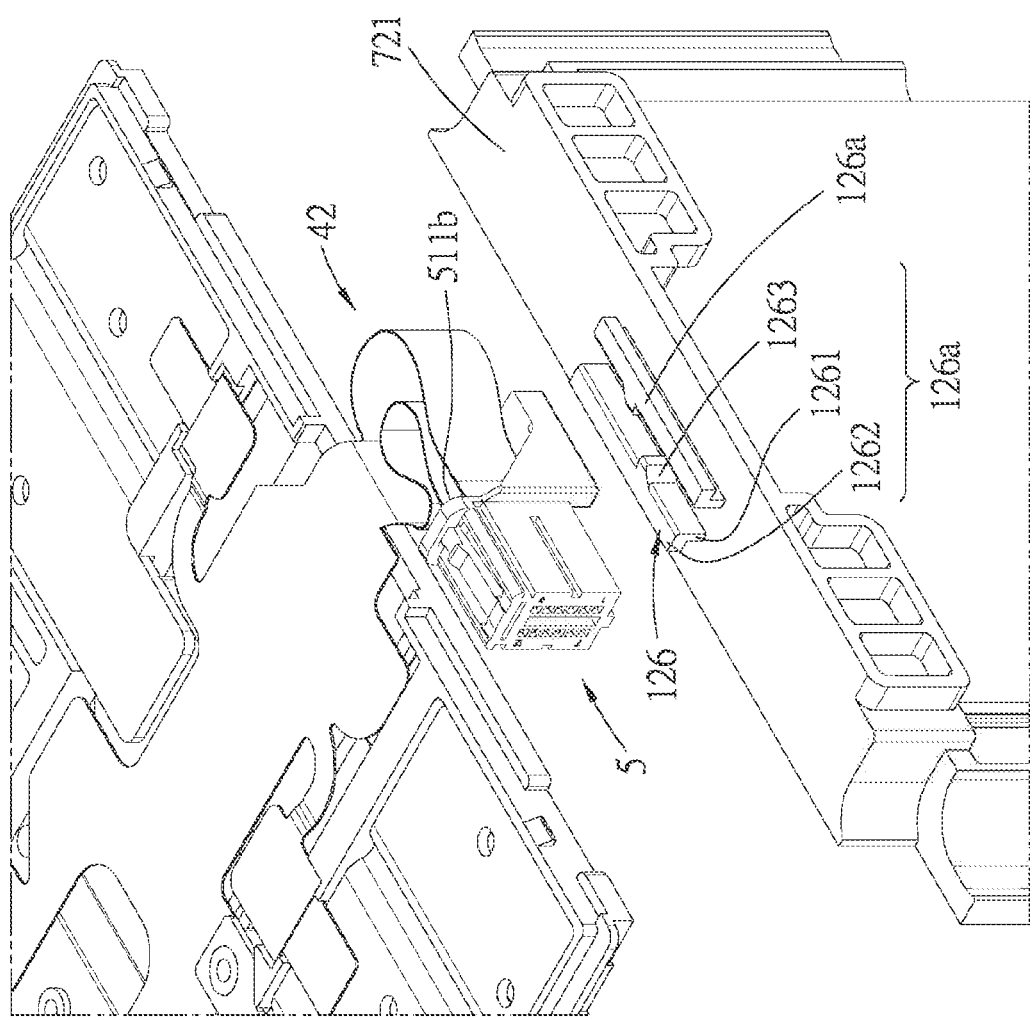
FIG. 13 is an enlarged view of a partial region of FIG. 12.

Referring to FIG. 11 to FIG. 13, a second embodiment of the battery connection module of the present disclosure differs from the first embodiment in that: the carrying tray 1 is not provided with the seat body 12, and the second latching structure 126 is formed on a side wall top surface 721 of the box body 72 of the battery pack 7 (see FIG. 1) to latch and fix with the first latching structure 513 (see FIG. 7) of the connector 5. The whole structure of the second latching structure 126 and its interaction with the first latching structure 513 in the second embodiment are the same as those of the first embodiment, and description will not be repeated here. In addition, in the second embodiment, the side cover 62 of the upper cover 6 at least covers the mounting bar 42 connected to the rear end 511b of the connector 5, similarly the mounting bar 42 and the connection between the mounting bar 42 and the connector 5 can be protected.

Figure 14:
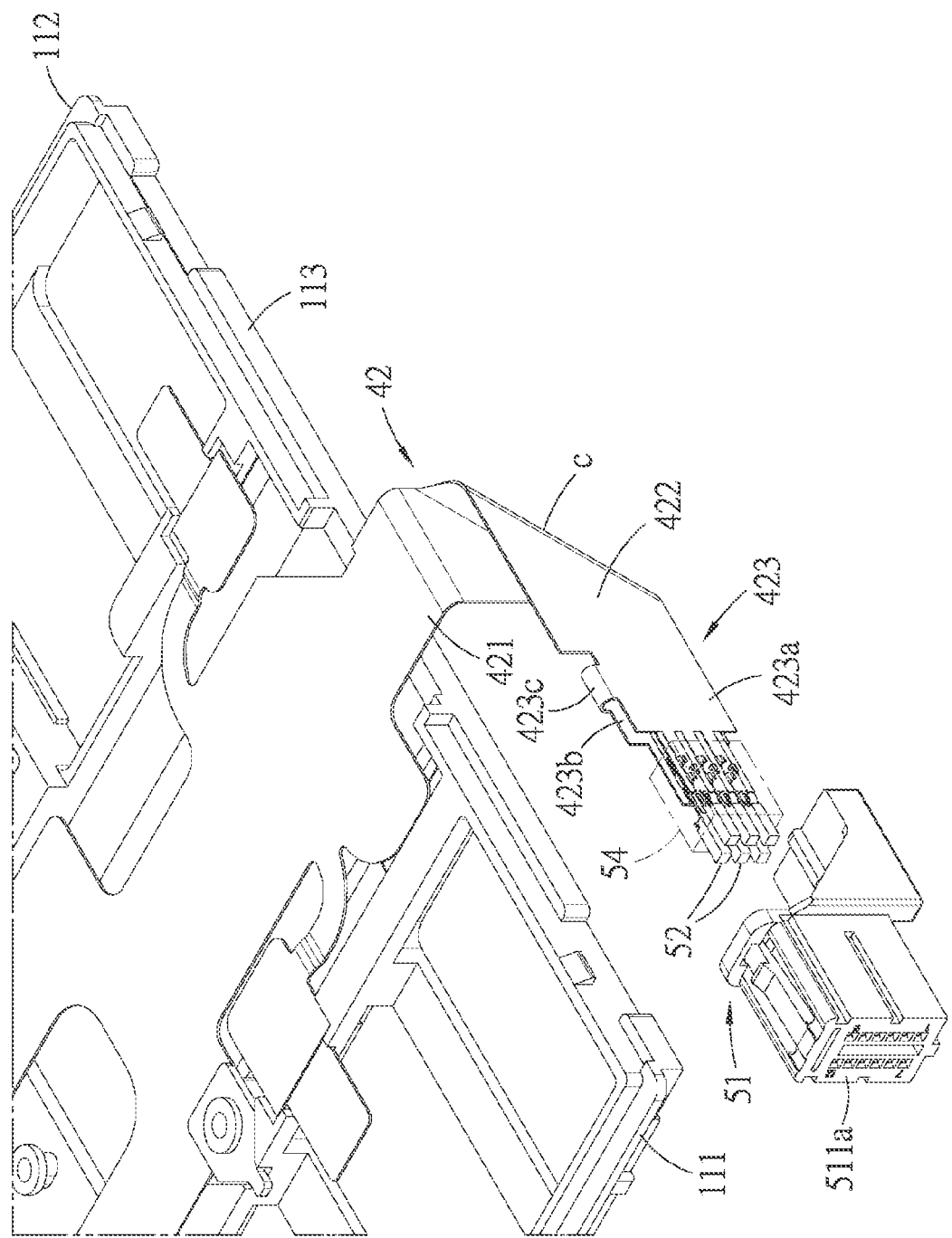
FIG. 14 is an exploded perspective schematic view of a third embodiment of the battery connection module of the present disclosure.
Figure 15:
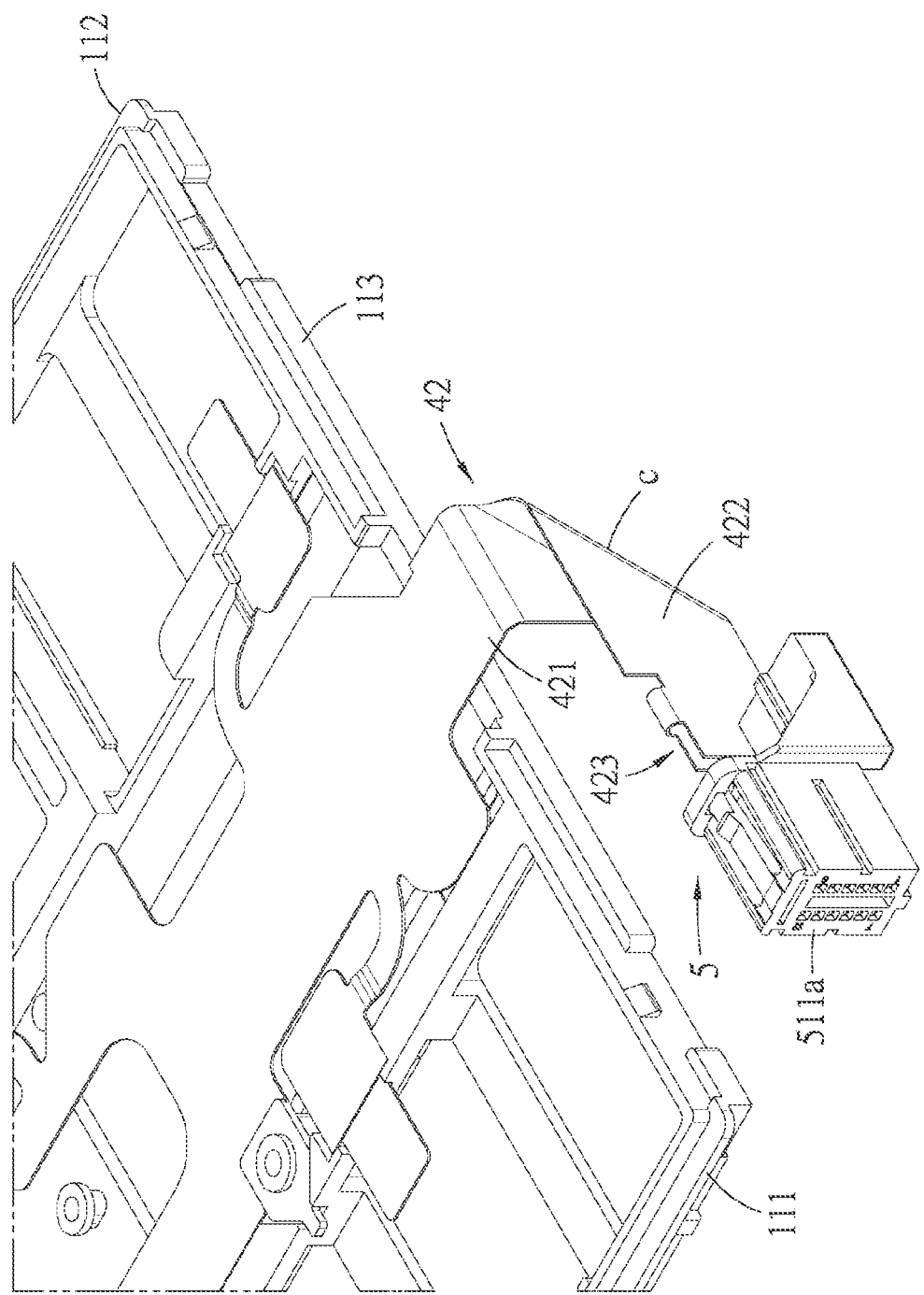
FIG. 15 is an assembled perspective view of the third embodiment of the battery connection module and illustrates that the connector is in the first position.
Figure 16:
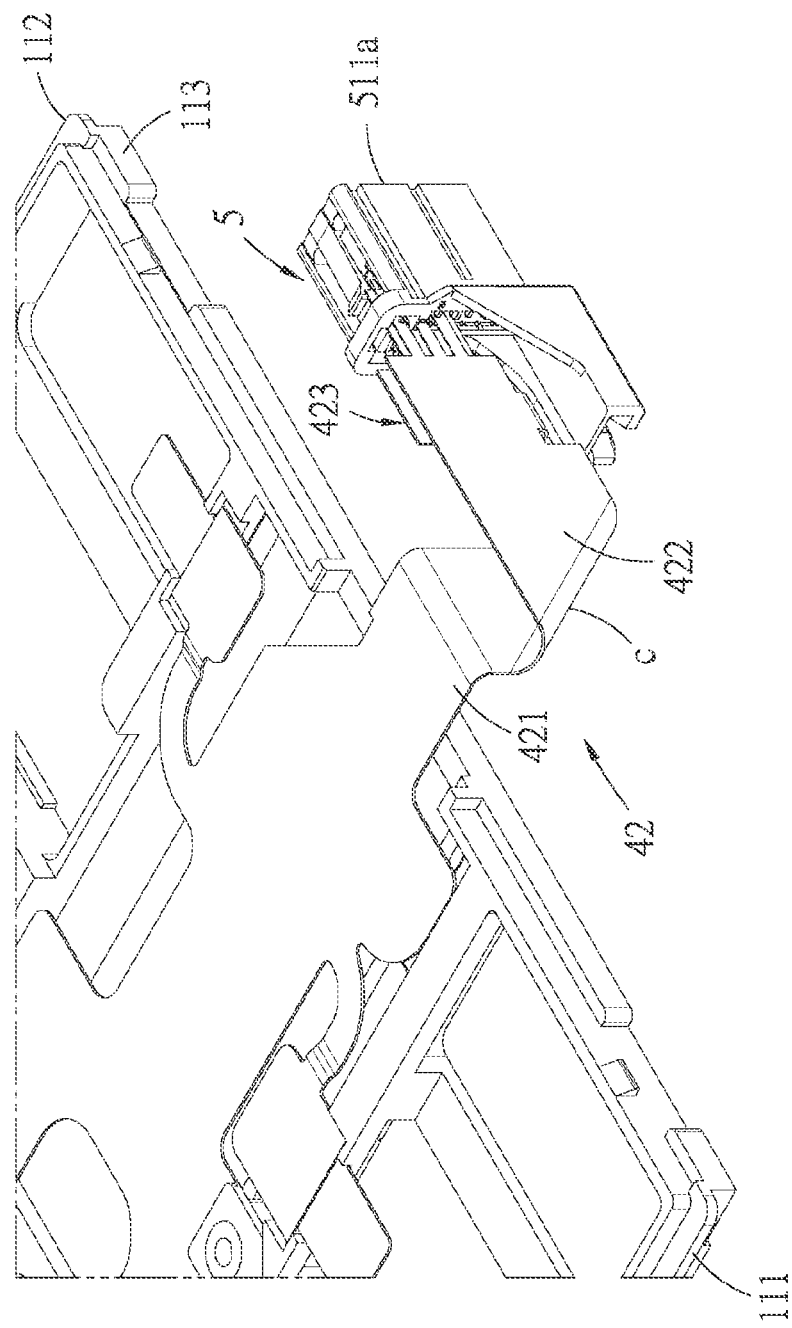
FIG. 16 is an assembled perspective view of the third embodiment of the battery connection module and illustrates that the connector is in the second position.
Figure 27:
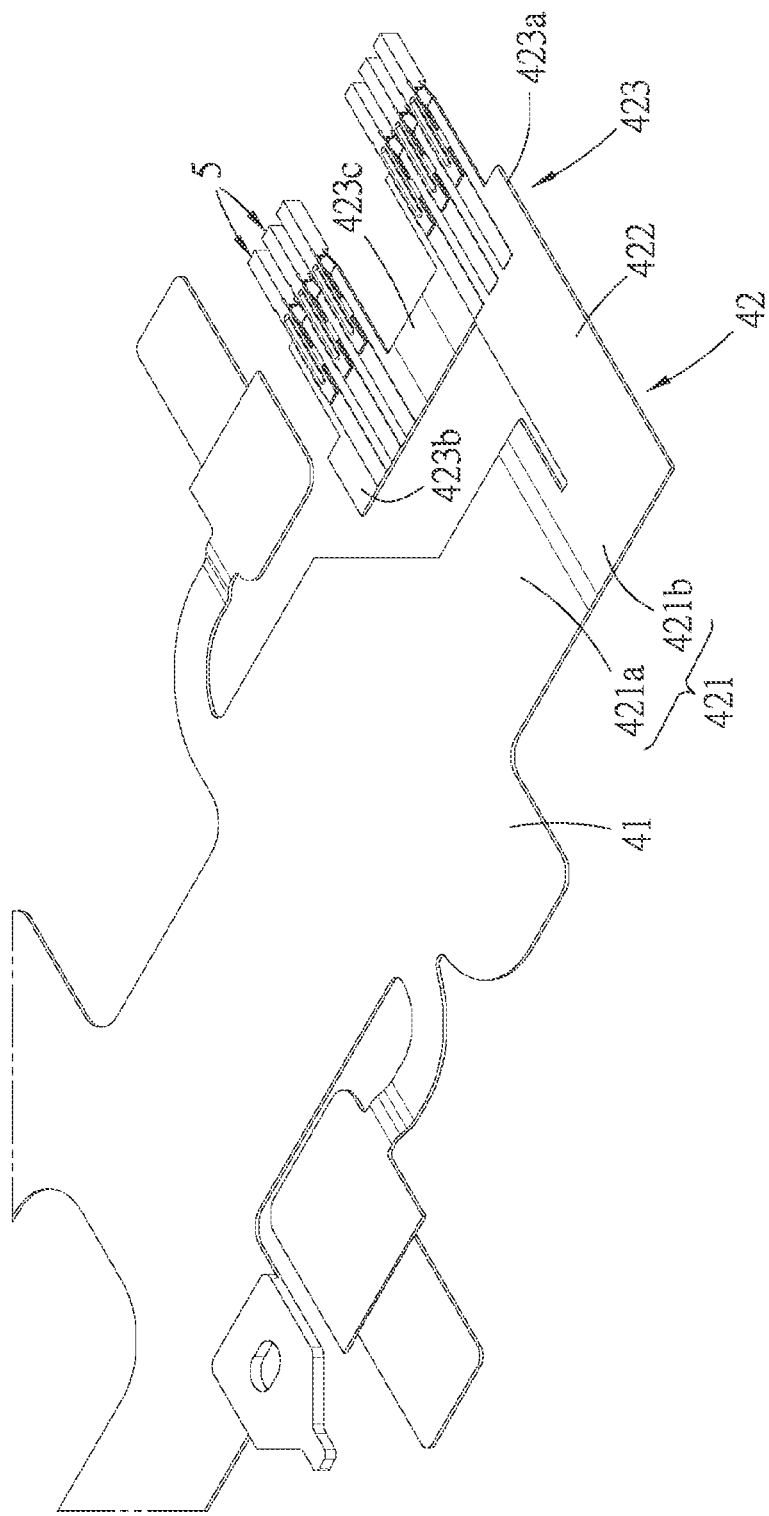
FIG. 27 is a perspective schematic view of the flexible circuit piece and the terminals of the seventh embodiment and illustrates that the unfolded state of a mounting bar of the flexible circuit piece before assembled.

Referring to FIG. 14 to FIG. 16, a third embodiment of the battery connection module of the present disclosure differs from the first embodiment in that: the mounting bar 42 has one bendable portion 422, the bendable portion 422 extends from a lower end of the connecting portion 421, the connector mounting portion 423 is formed by a first mounting section 423a at the distal end of the bendable portion 422, a second mounting section 423b arranged side by side with the first mounting section 423a and a connecting section 423c curvedly connected between the first mounting section 423a and the second mounting section 423b (the unfolded state of the connector mounting portion 423 before assembled can be referred to FIG. 27). The tail portions 521 of the two rows of terminals 52 are respectively provided on the first mounting section 423a and the second mounting section 423b, in the third embodiment, the tail portions 521 of the plurality of terminals 52 are formed into an insulator 54 by insert molding and then are assembled with the insulating housing 51, this assembling method can also be adapted to other embodiments described above or below. The bendable portion 422 is operable to turn once toward t the first edge 111 side and bend at an angle of 45 degrees to form one bend C such that the mating end 511a of the connector 5 faces the first edge 111 side and the connector 5 is positioned at the first position (as shown in FIG. 15); or alternatively, the bendable portion 422 is operable to turn once toward the second edge 112 side and bend at an angle of 45 degrees to form one bend C such that the mating end 511a of the connector 5 faces the second edges 112 side and the connector 5 is at the second position (as shown in FIG. 16). In the third embodiment, the insulating housing 51 of the connector 5 can be assembled with the terminals 52 after determining that the connector 5 is to be positioned at the first position or the second position, and the first latching structure 513 (see FIG. 7) of the connector 5 is provided downwardly.

Figure 17:
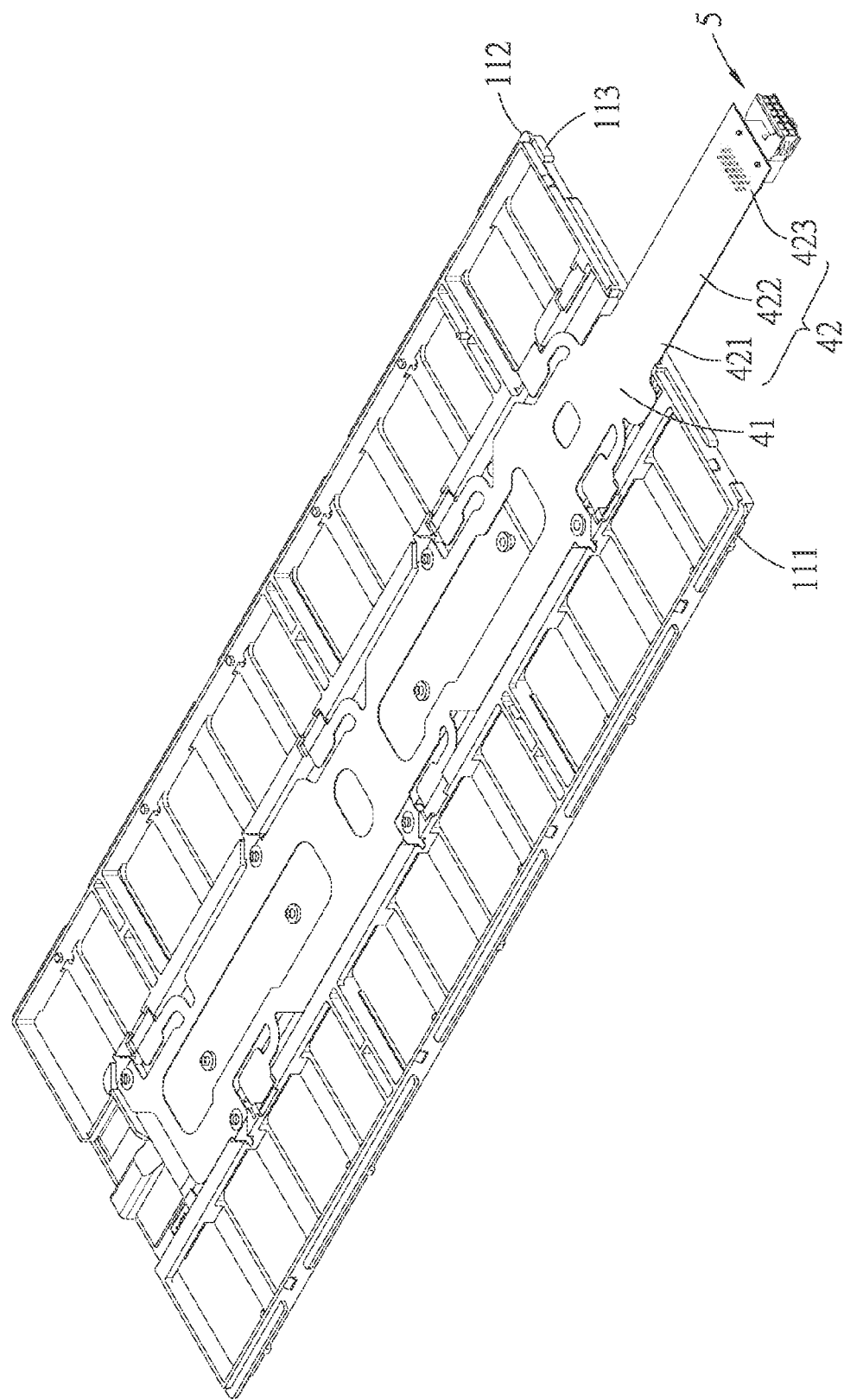
FIG. 17 is a perspective schematic view of a fourth embodiment of the battery connection module of the present disclosure.
Figure 18:
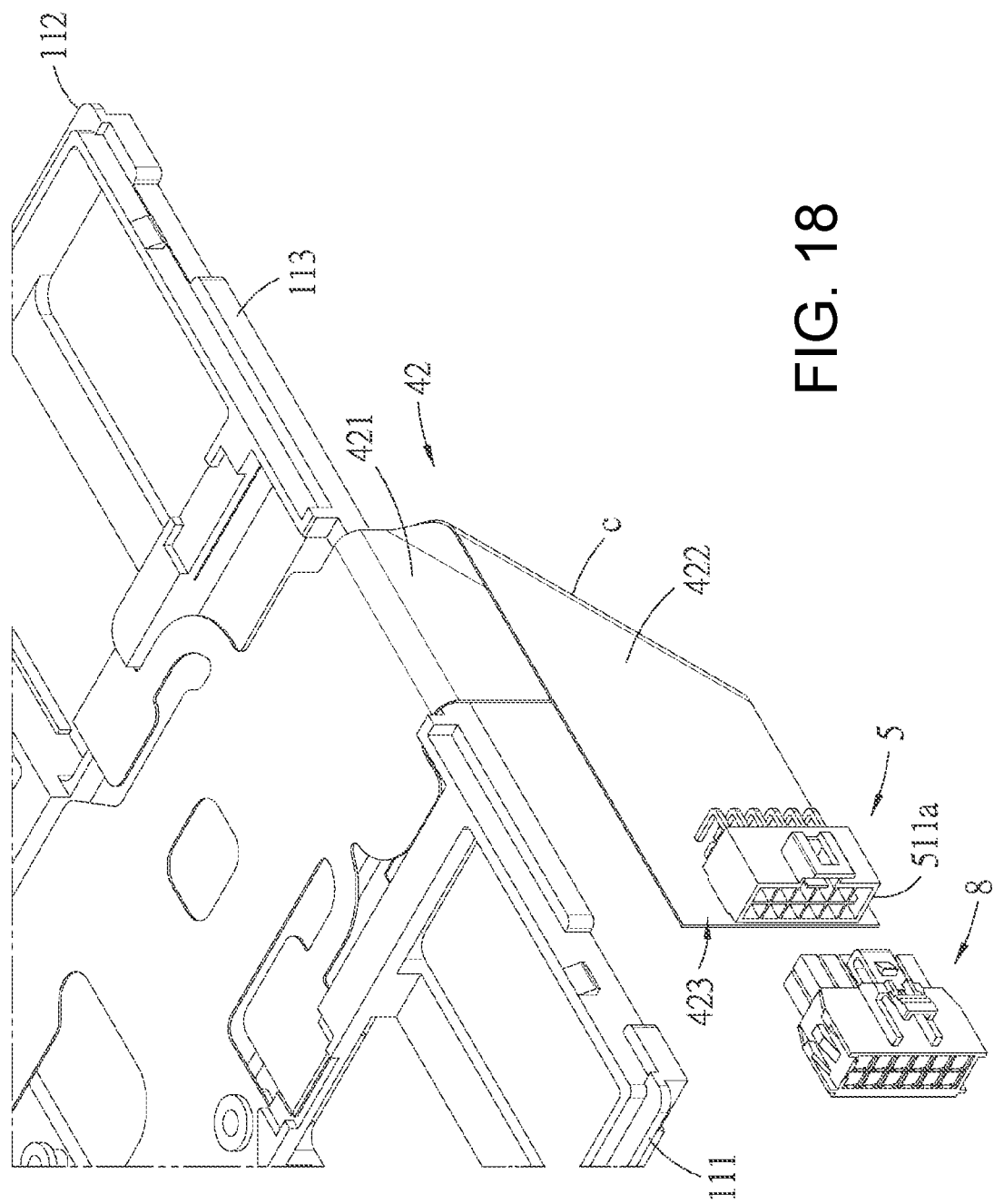
FIG. 18 is a perspective view of the fourth embodiment and illustrates that the connector is in the first position.
Figure 19:
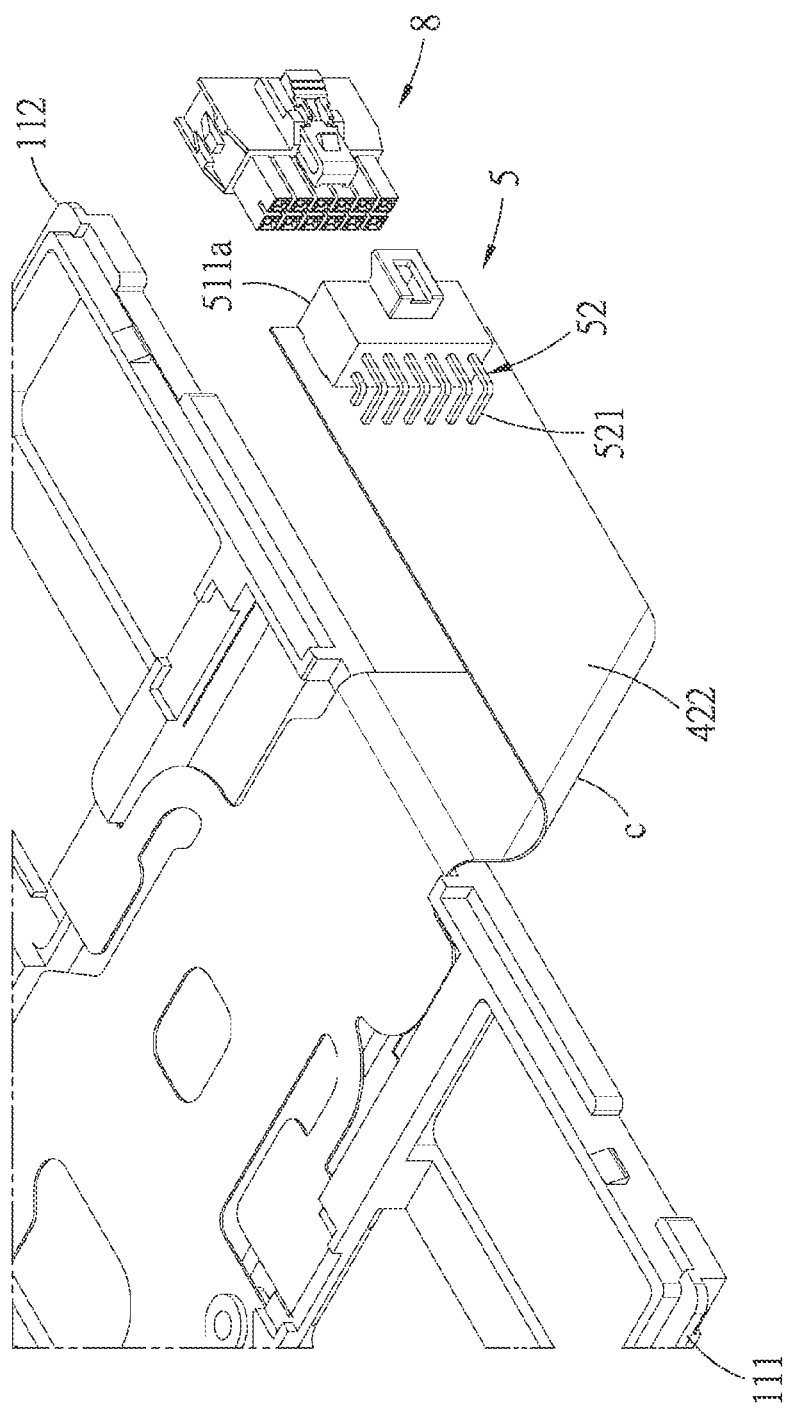
FIG. 19 is a perspective view of the fourth embodiment and illustrates that the connector is in the second position.

Referring to FIG. 17 to FIG. 19, a fourth embodiment of the battery connection module of the present disclosure differs from the third embodiment in that: the connector mounting portion 423 of the mounting bar 42 integrally extends from the lower end of the bendable portion 422, and the connector 5 is provided on the connector mounting portion 423 by welding the tail portions 521 of the terminals 52 directly (the figures shows through-hole welding, but also can use surface welding) to connect with the conductive lines. The mating end 511a of the connector 5 can be mated with a mating connector 8, the mating connector 8 may be, for example, a cable connector.

Figure 20:
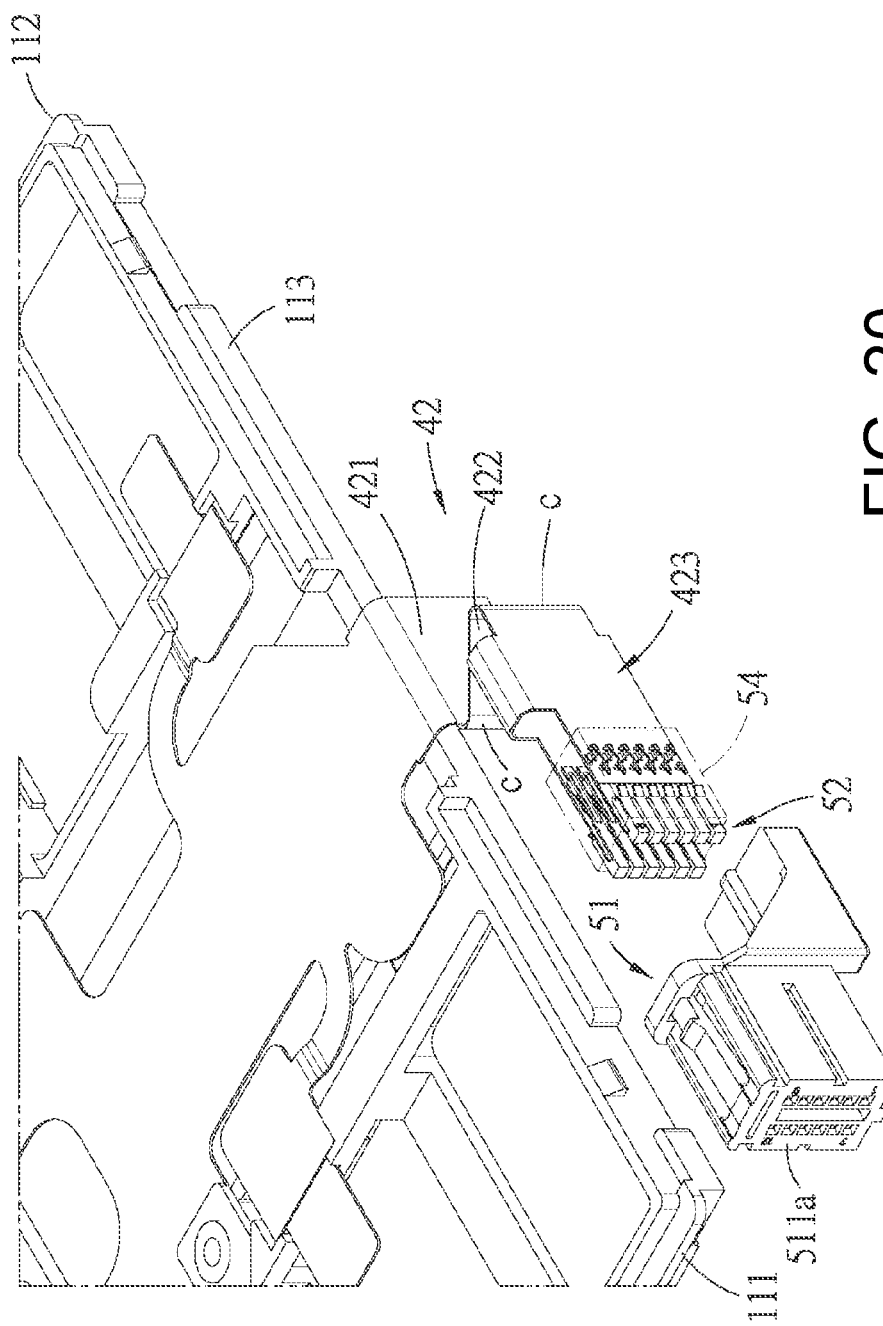
FIG. 20 is an exploded perspective schematic view of a fifth embodiment of the battery connection module of the present disclosure.
Figure 21:
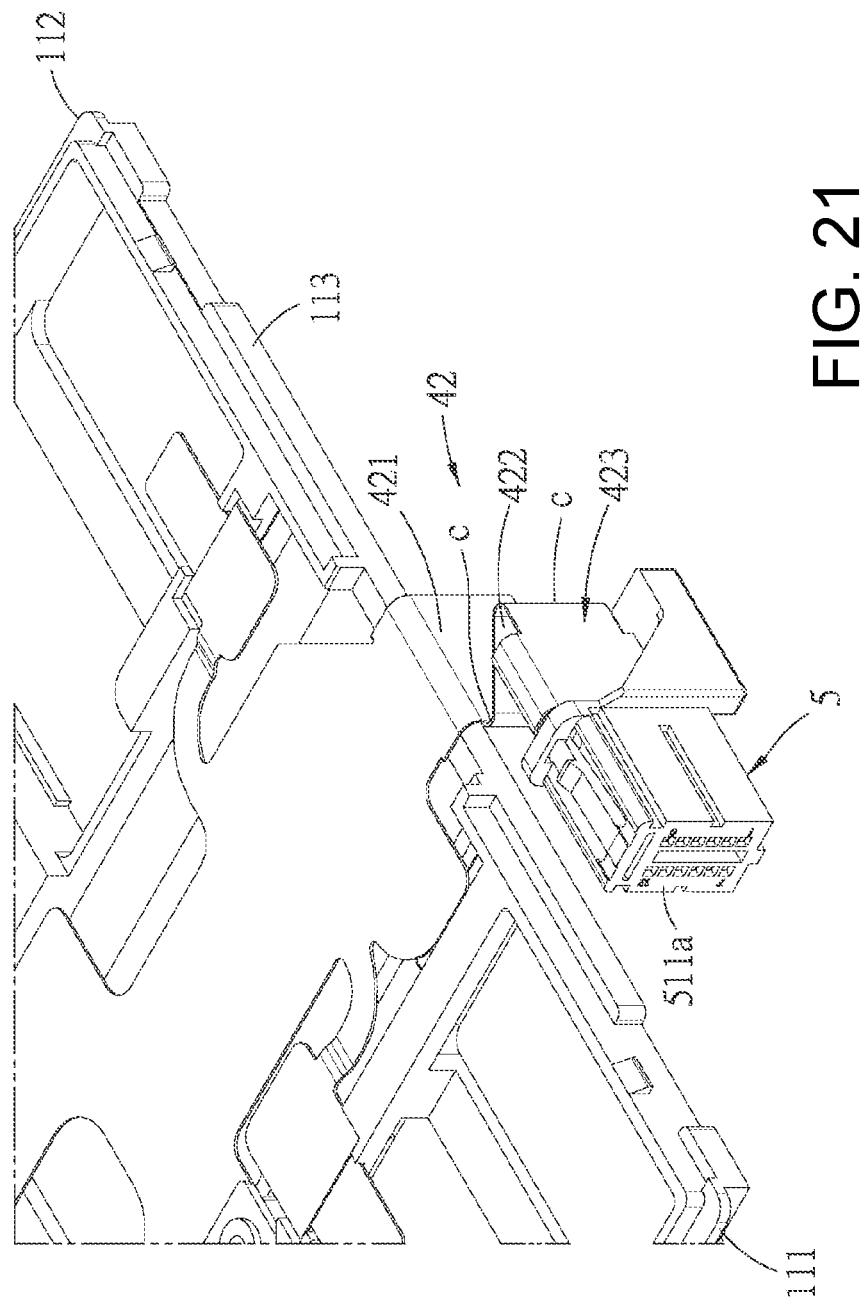
FIG. 21 is a perspective view of the fifth embodiment and illustrates that the connector is in the first position.
Figure 22:
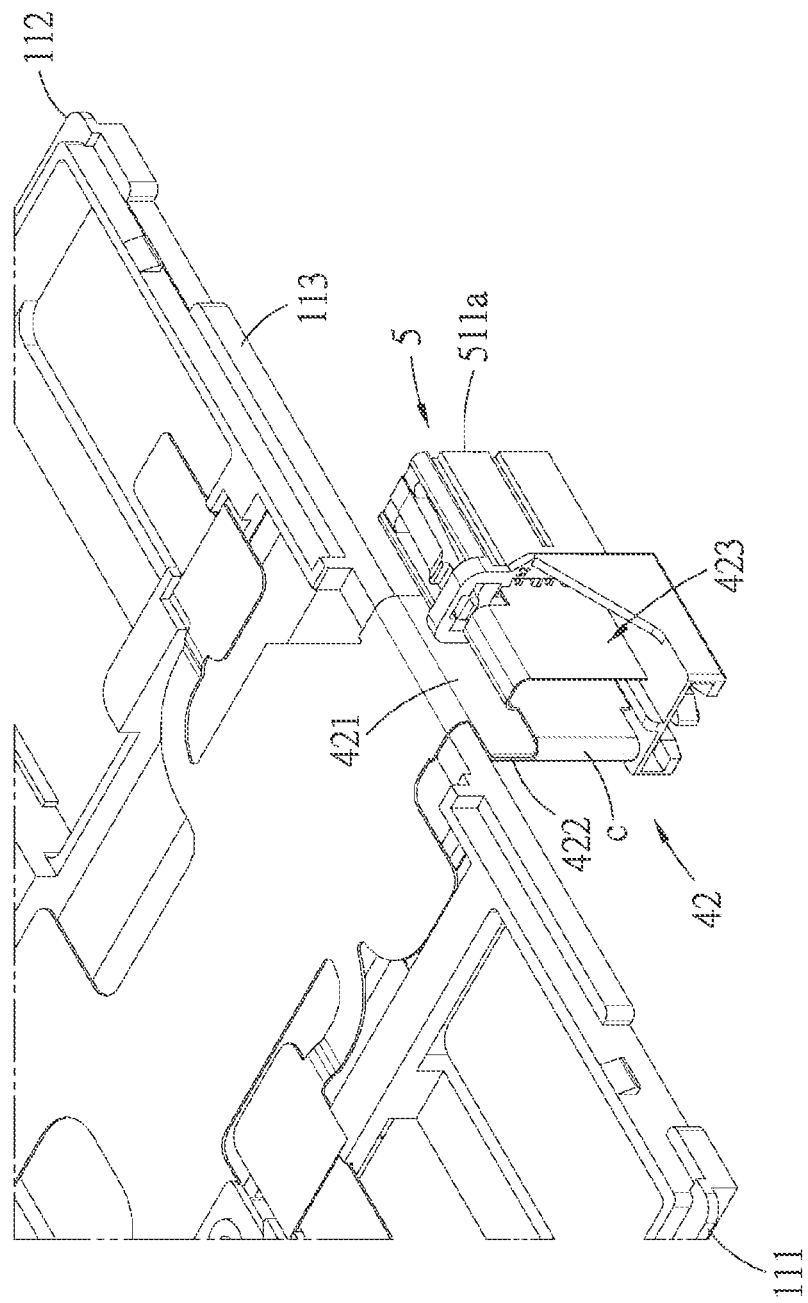
FIG. 22 is a perspective view of the fifth embodiment and illustrates that the connector is in the second position.

Referring to FIG. 20 to FIG. 22, a fifth embodiment of the battery connection module of the present disclosure differs from the third embodiment in that: the bendable portion 422 extends sideward from a side of the connecting portion 421 corresponding to the first edge 111, the bendable portion 422 is operable to turn twice firstly toward the second edge 112 side and then turn toward the first edge 111 side to form two bends C so as to allow the connector 5 to be positioned at the first position (as shown in FIG. 21); or alternatively, the bendable portion 422 is operable to turn once toward the second edge 112 side to form one bend C so as to allow the connector 5 to be positioned at the second position (as shown in FIG. 22).

Figure 23:
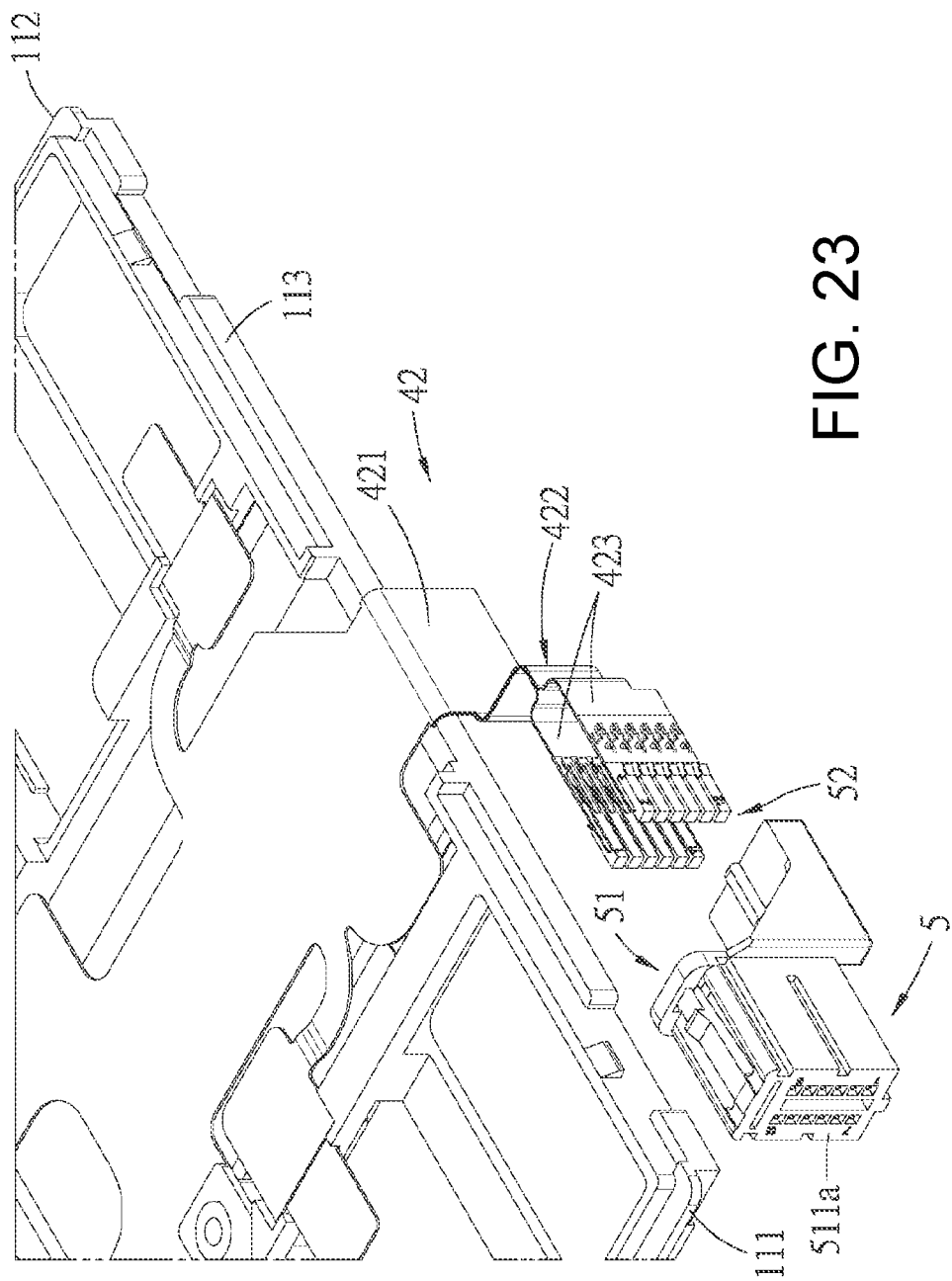
FIG. 23 is an exploded perspective schematic view of a sixth embodiment of the battery connection module of the present disclosure.
Figure 24:
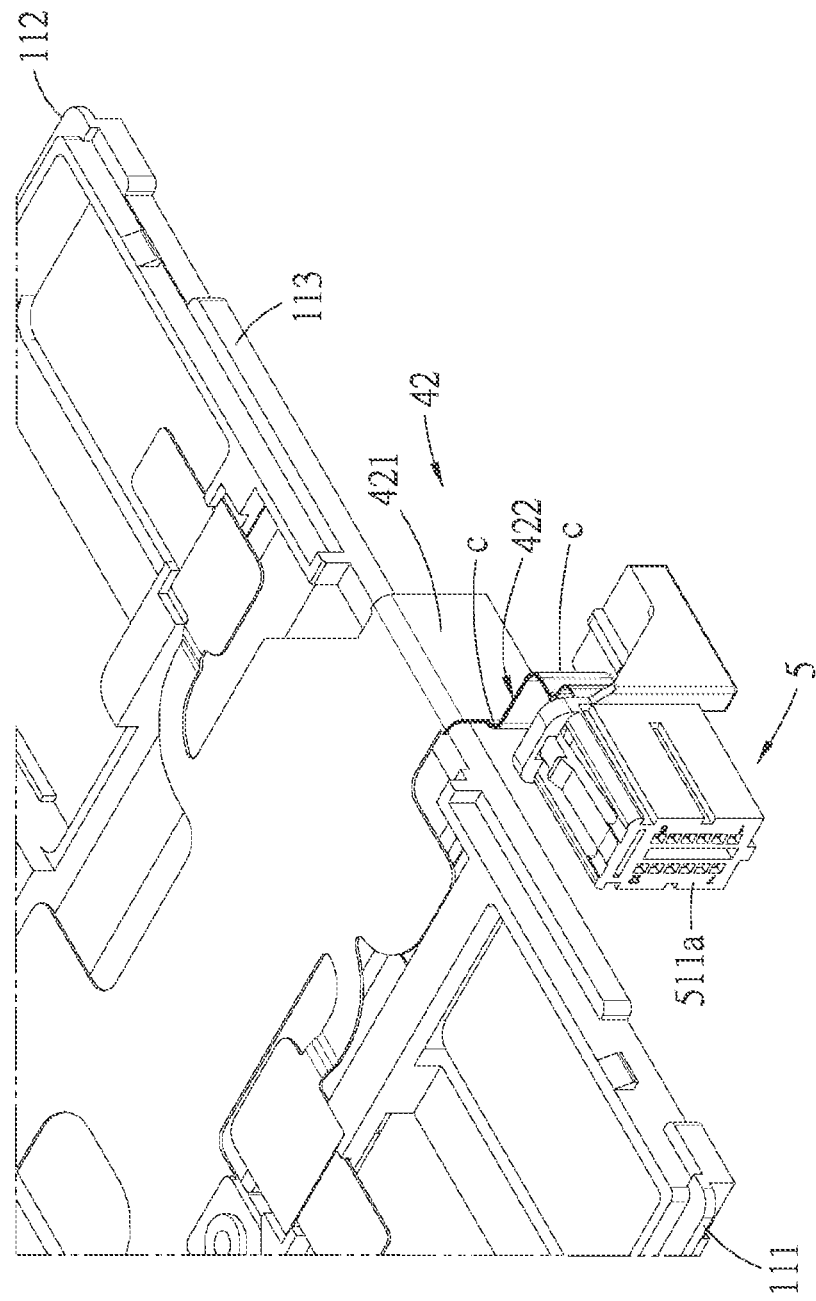
FIG. 24 is a perspective view of the sixth embodiment and illustrates that the connector is in the first position.
Figure 25:
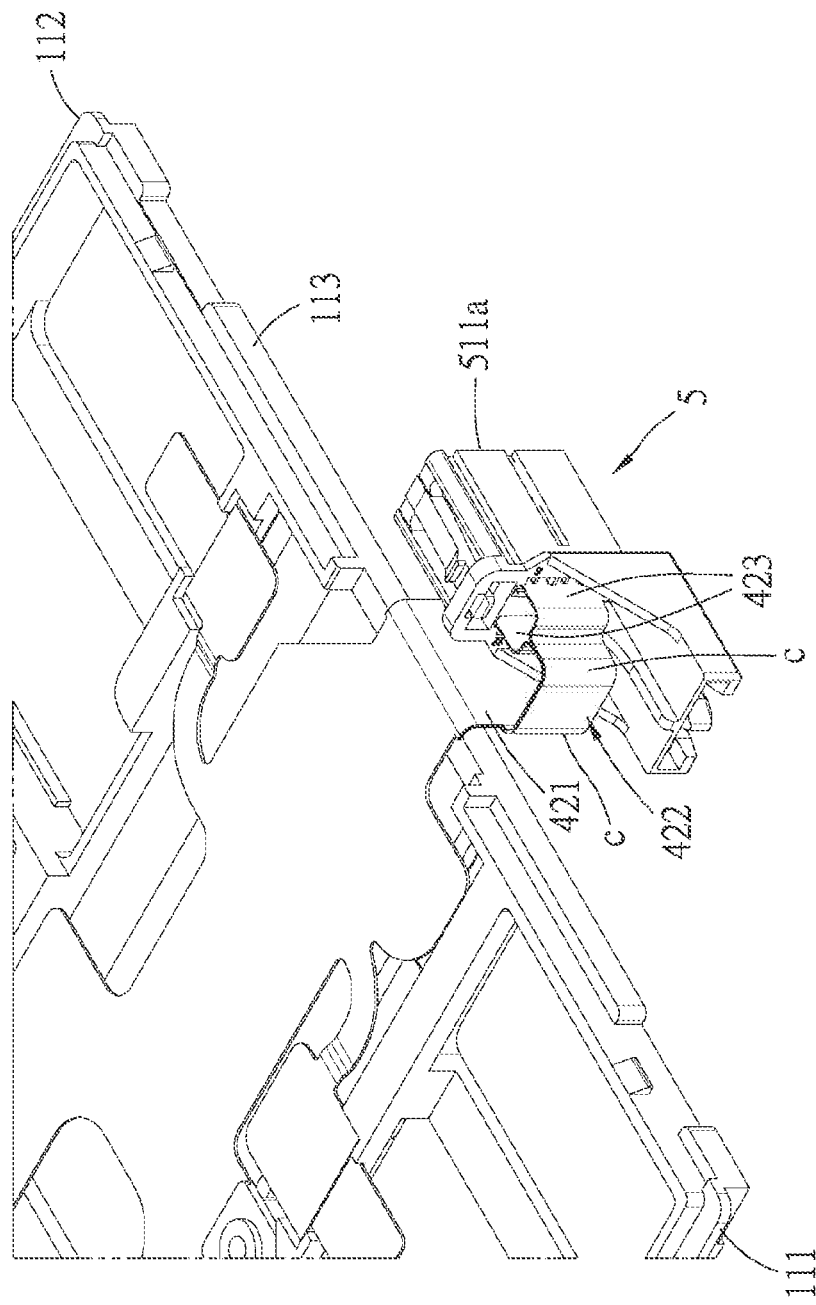
FIG. 25 is a perspective view of the sixth embodiment and illustrates that the connector is in the second position.
Figure 26:
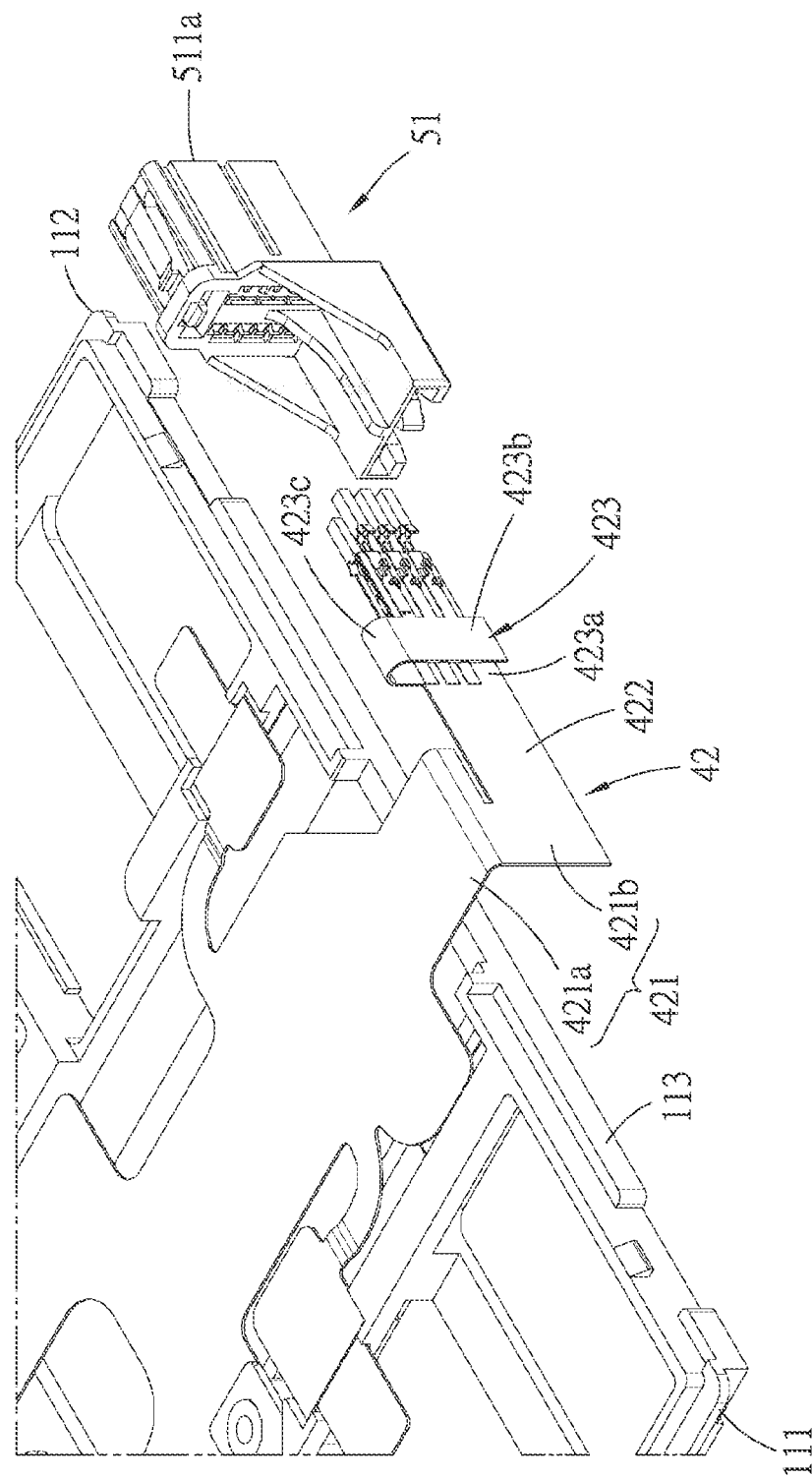
FIG. 26 is an exploded perspective schematic view of a seventh embodiment of the battery connection module of the present disclosure.

Referring to FIG. 23 to FIG. 25, a sixth embodiment of the battery connection module of the present disclosure differs from the fifth embodiment in that: the distal end of the bendable portion 422 is layered to form two connector mounting portions 423 arranged side by side with each other. The bendable portion 422 is operable to turn twice firstly toward a direction away from the end edge 113 and then turn toward the first edge 111 side to form two bends C so as to allow the connector 5 to be positioned at the first position (as shown in FIG. 24); or alternatively, the bendable portion 422 is operable to turn totally twice (that is firstly turn toward the direction away from the end edge 113 and then turn toward the second edge 112 side to form two bends C so as to allow the connector 5 to be positioned at the second position (as shown in FIG. 25).

Figure 28:
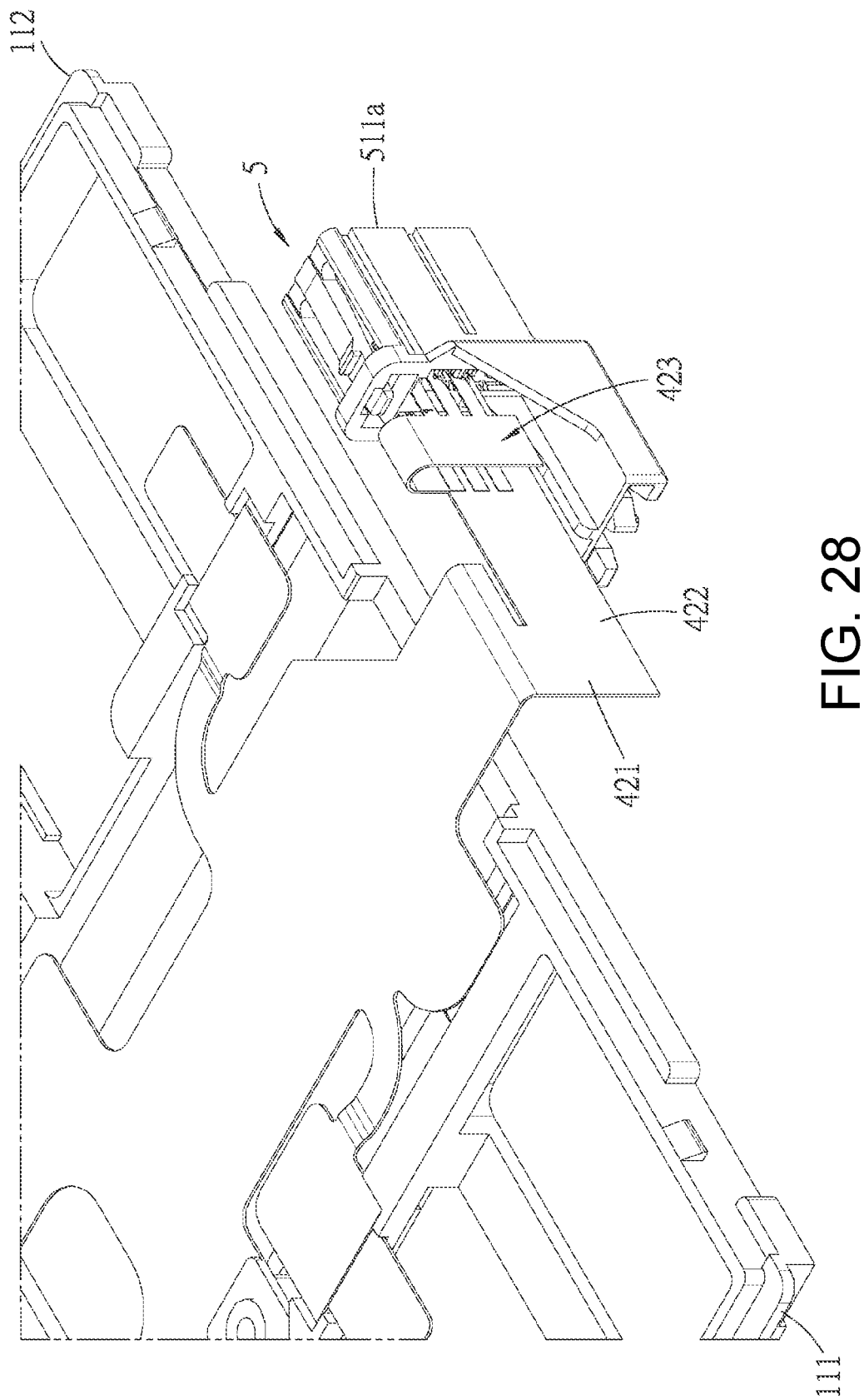
FIG. 28 is a perspective view of the seventh embodiment and illustrates that the connector is in the second position.
Figure 29:
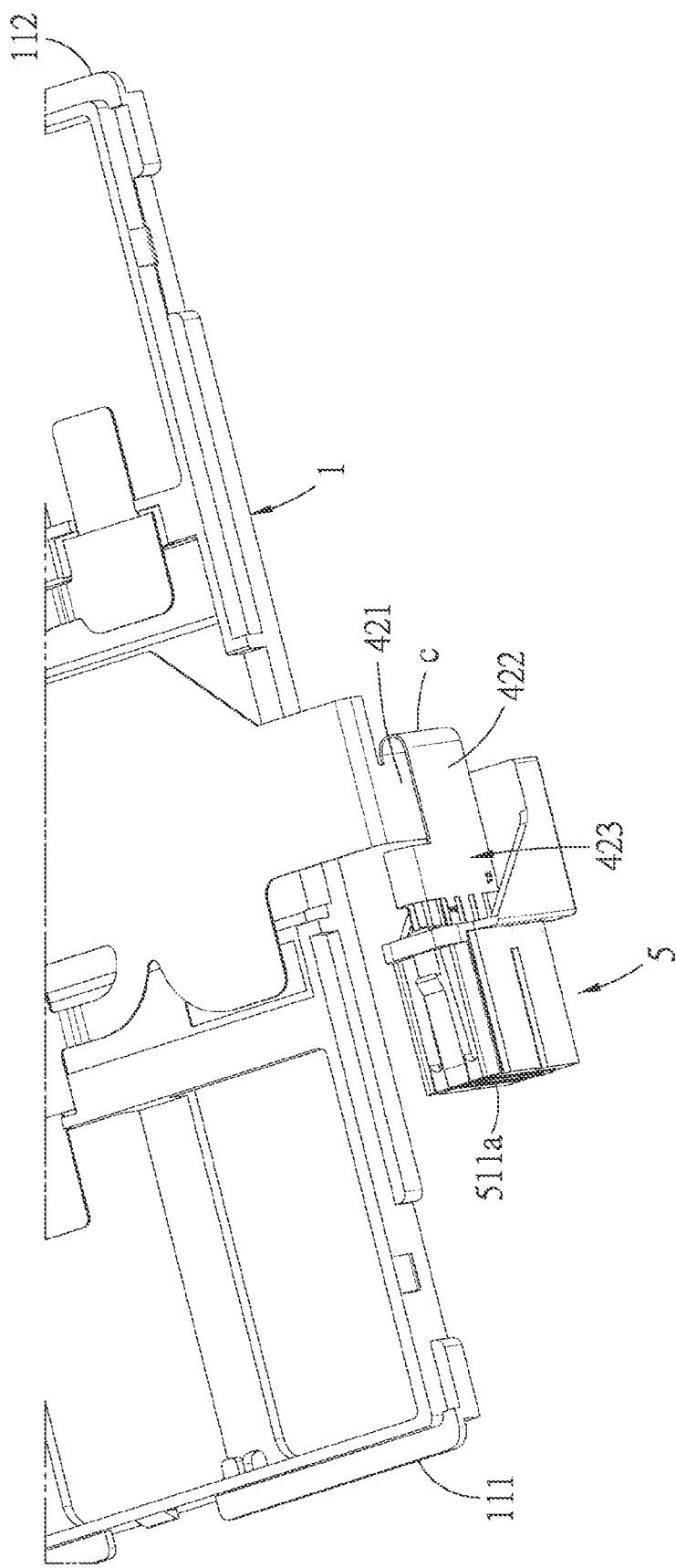
FIG. 29 is a perspective view of the seventh embodiment and illustrates that the connector is in the first position.

Referring to FIG. 26 to FIG. 29, a seventh embodiment of the battery connection module of the present disclosure differs from the fifth embodiment in that: the bendable portion 422 extends sideward from a side of the connecting portion 421 corresponding to the second edge 112, the bendable portion 422 is operable to turn once toward the first edge 111 side to form one bend C so as to allow the connector 5 to be positioned at the first position (as shown in FIG. 29); or alternatively, the bendable portion 422 is not turned and in turn does not form any bend so as to allow the connector 5 to be positioned at the second position (as shown in FIG. 28). Specifically, in the seventh embodiment, the connecting portion 421 has a base portion 421a and an extending portion 421b extending from a lower end of the base portion 421a close to the first edge 111 side, the bendable portion 422 extends sideward from a side of the extending portion 421b corresponding to the second edge 112 and is spaced apart from the base portion 421a by a gap. In the seventh embodiment, the connector mounting portion 423 of the mounting bar 42 is also formed by the first mounting section 423a, the second mounting section 423b and the connecting section 423c, its unfolded state is shown in FIG. 27, the connecting section 423c is to bend to arrange the first, second mounting section 423a, 423b side by side after the terminals 52 are mounted. Moreover, as shown in FIG. 29, in the seventh embodiment, the bendable portion 422 is operable to turn once toward the first edge 111 side and pass through an outer side of the connecting portion 421 with respect to the carrying tray 1 so as to allow the connector 5 to be positioned at the first position.

Figure 30:
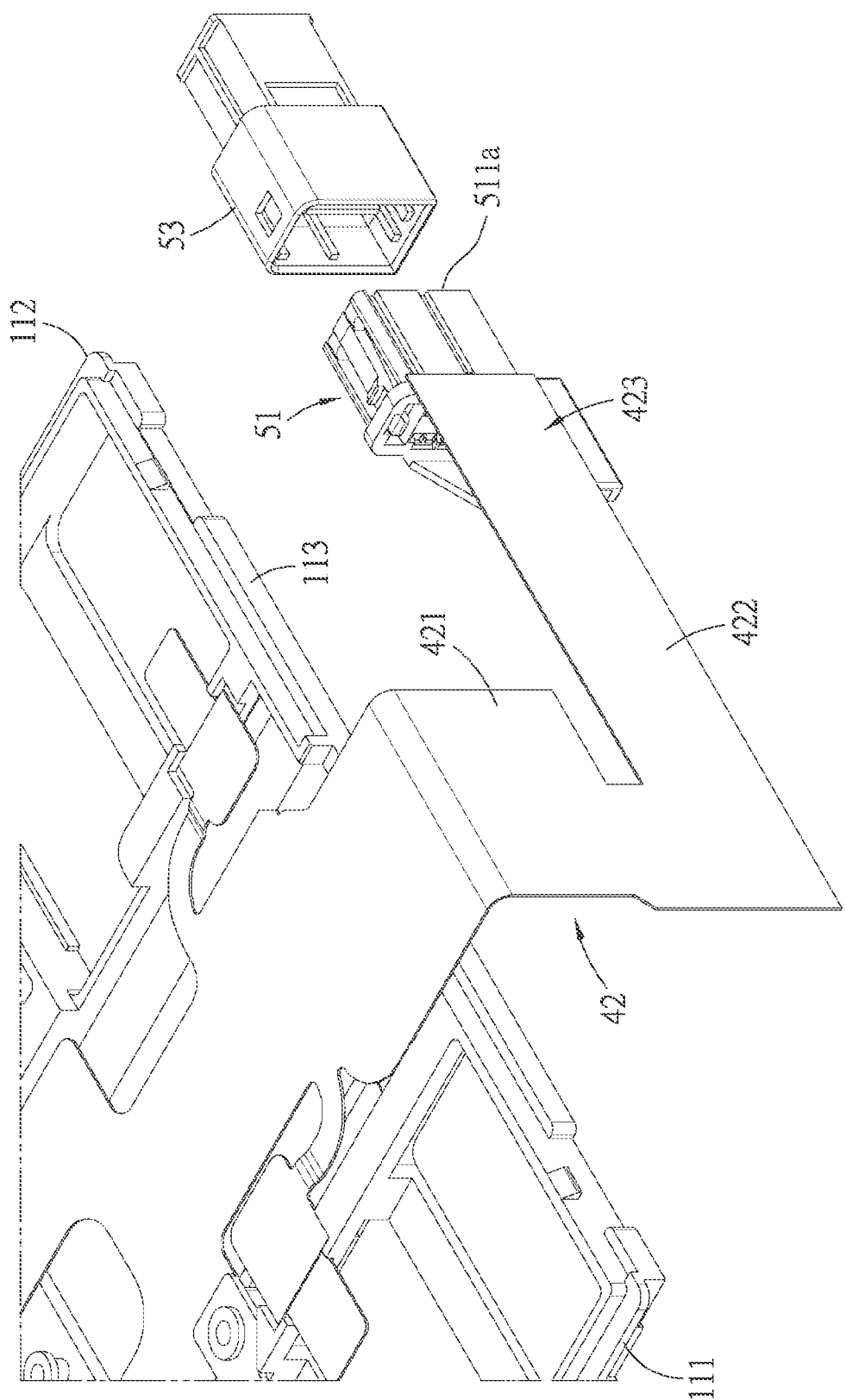
FIG. 30 is an exploded perspective schematic view of an eighth embodiment of the battery connection module of the present disclosure.
Figure 31:
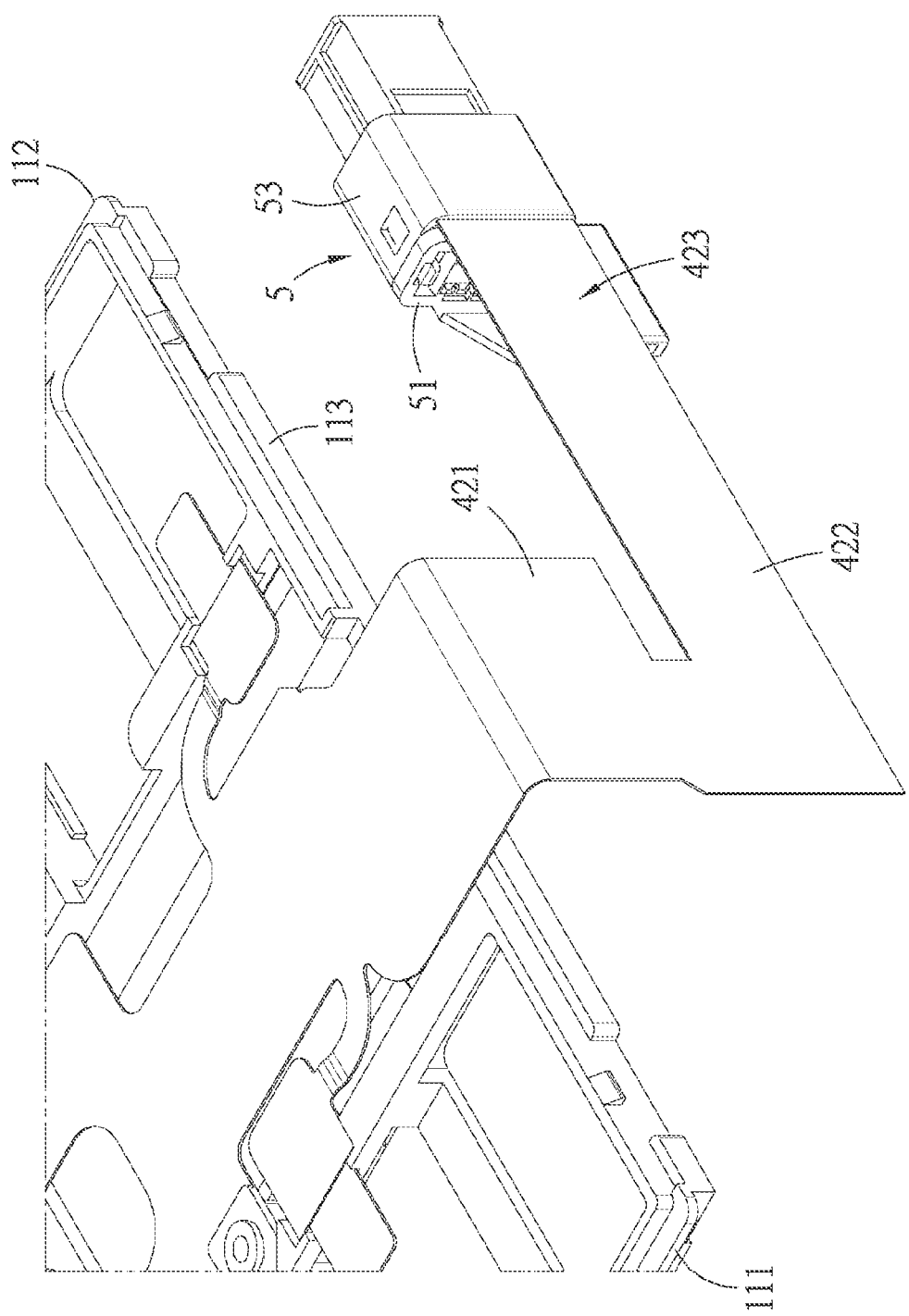
FIG. 31 is a perspective schematic view of the eighth embodiment and illustrates that the connector is in the second position.
Figure 32:
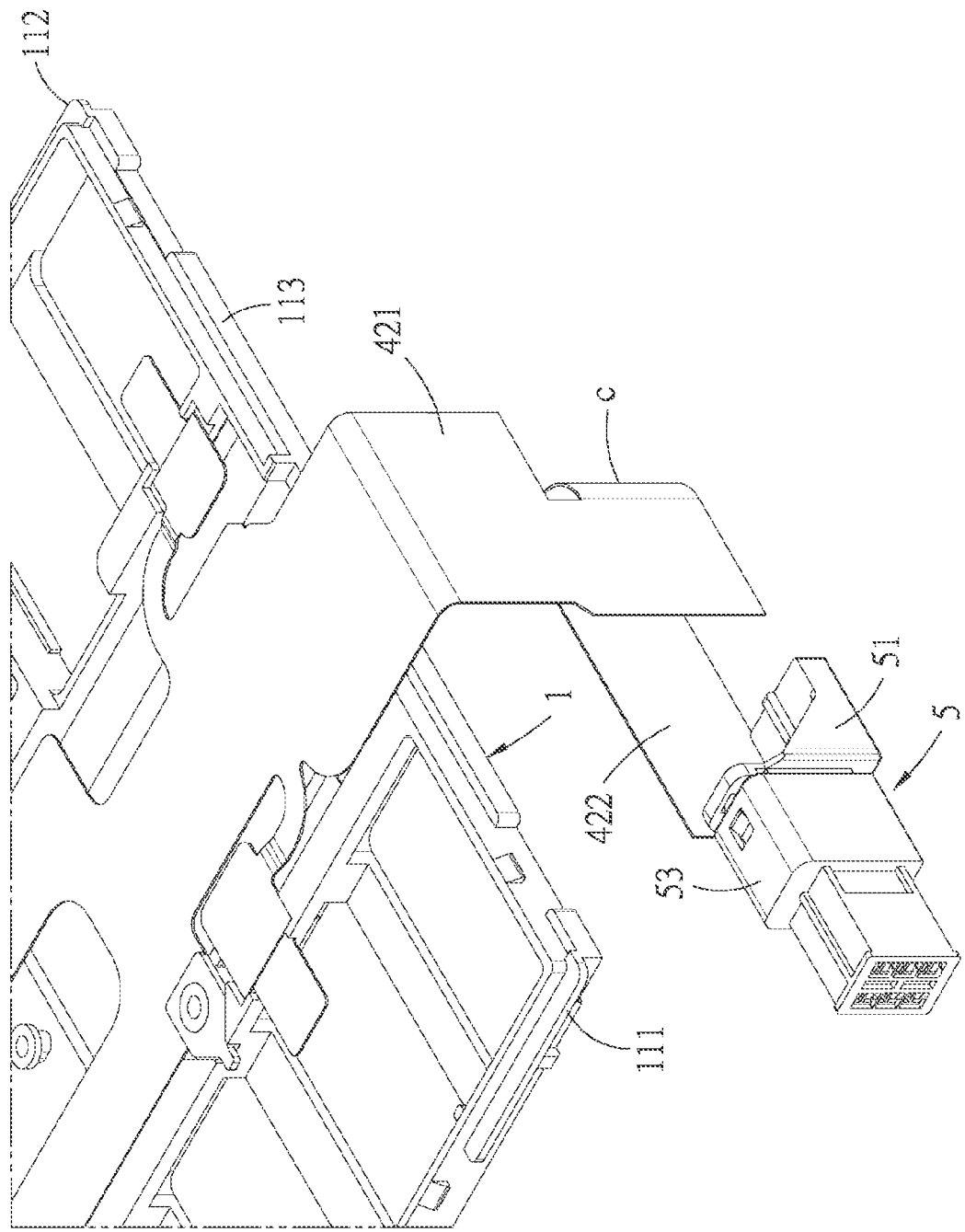
FIG. 32 is a perspective schematic view of the eighth embodiment and illustrates that the connector is in the first position.

Referring to FIG. 30 to FIG. 32, an eighth embodiment of the battery connection module of the present disclosure differs from the seventh embodiment in that: the connector 5 further comprises an outer casing 53 sheathed on the insulating housing 51, and the bendable portion 422 is operable to turn once toward the first edge 111 side and pass through an inner side of the connecting portion 421 with respect to the carrying tray 1 so as to allow the connector 5 to be positioned at the first position (as shown in FIG. 32). In the eighth embodiment, the connector mounting portion 423 of the mounting bar 42 and the structure of the terminals 52 are the same as those of the seventh embodiment, but they are not shown in FIG. 30 to FIG. 32 and are schematically illustrated.

Figure 33:
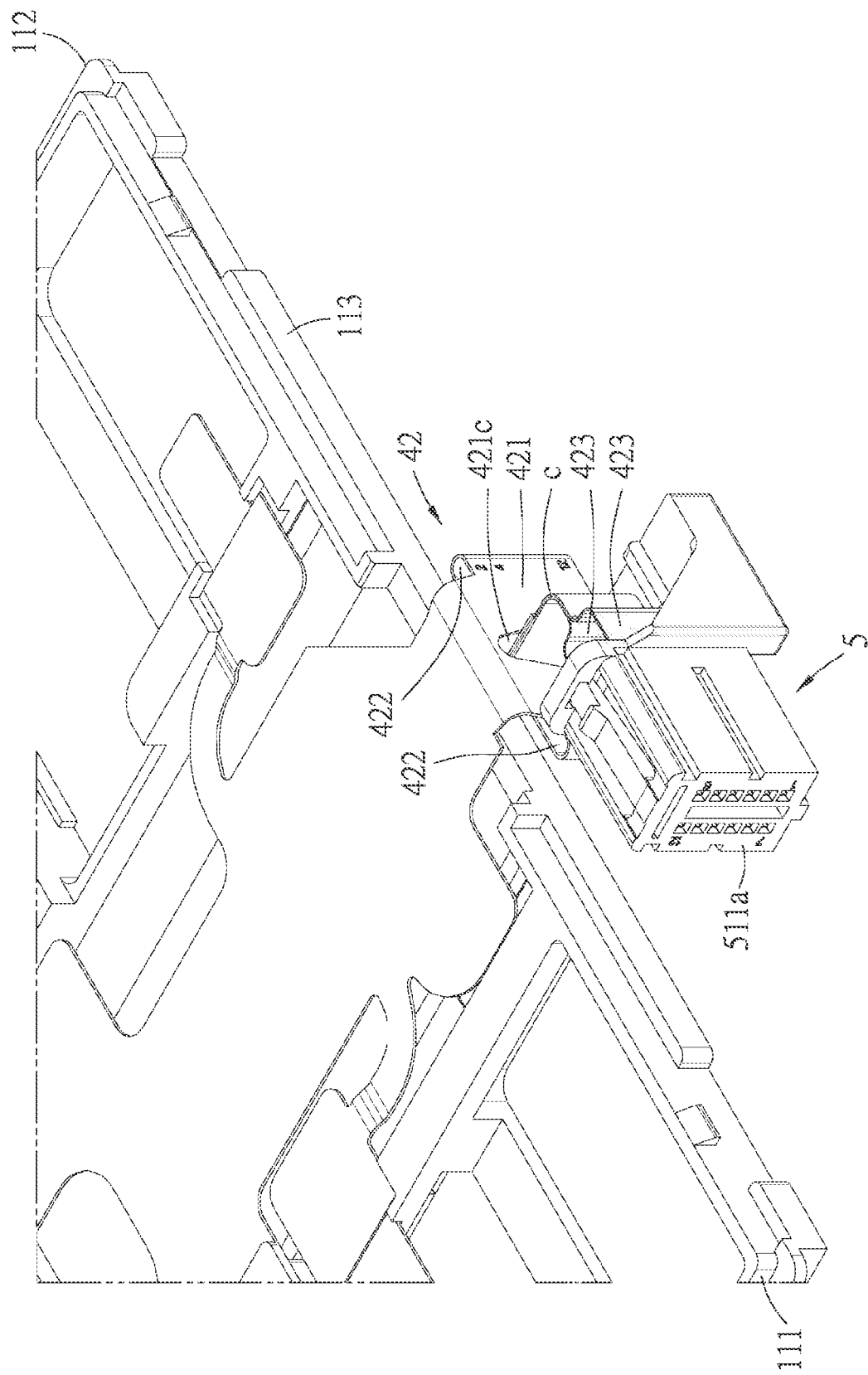
FIG. 33 is a perspective view of a ninth embodiment of the connection module battery of the present disclosure and illustrates the connector is in the first position.
Figure 34:
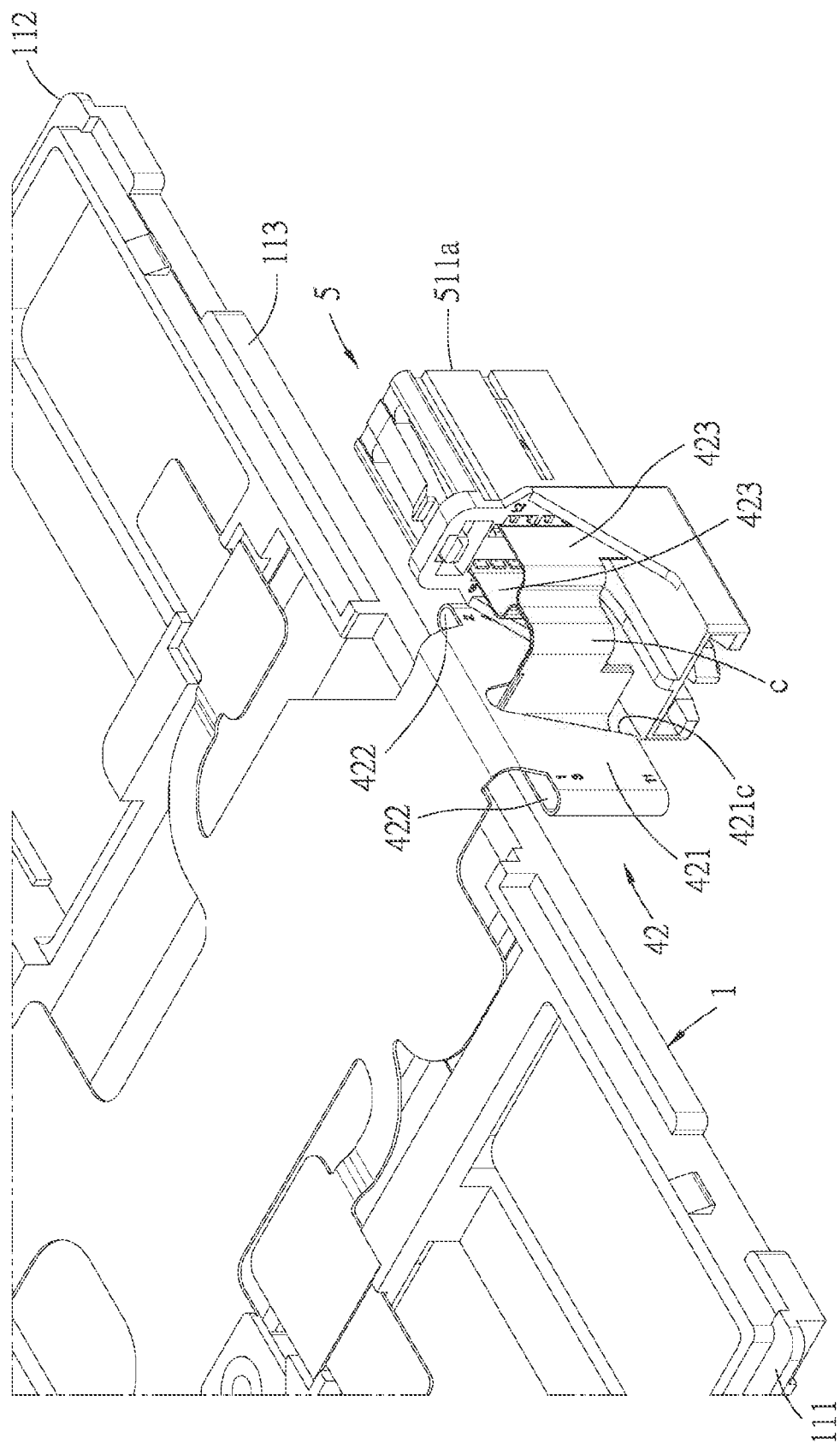
FIG. 34 is a perspective view of the ninth embodiment and illustrates that the connector is in the second position.
Figure 35:
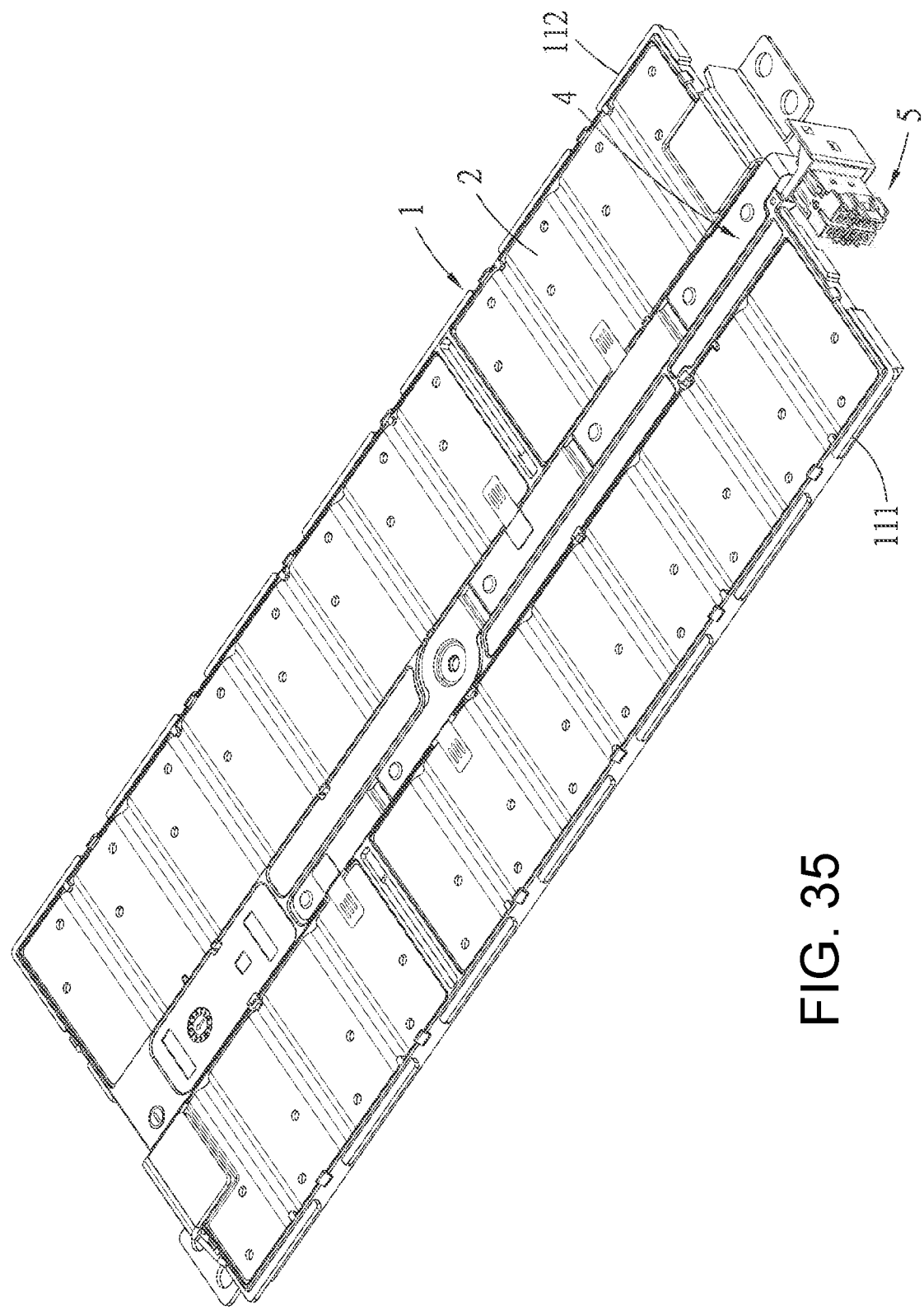
FIG. 35 is a perspective view of a tenth embodiment of the battery connection module of the present disclosure.

Referring to FIG. 33 to FIG. 34, a ninth embodiment of the connection module battery of the present disclosure differs from the first embodiment in that: the connecting portion 421 of the mounting bar 42 has a cutout 421c, and the two bendable portions 422 of the mounting bar 42 respectively bend from the two sides of the connecting portion 421 respectively corresponding to the first edge 111 and the second edge 112 toward an inner side of the connecting portion 421 with respect to the carrying tray 1, then extend in facing each other, then bend toward an outer side of the connecting portion 421 with respect to the carrying tray 1, merge and pass through the cutout 421c, and then separate at a distal end of the merged region to form two connector mounting portions 423. The merged region of the two bendable portions 422 is operable to turn once toward the first edge 111 side to form one bend C so as to allow the connector 5 to be positioned at the first position (as shown in FIG. 33); or alternatively, the merged region of the two bendable portions 422 is operable to turn once toward the second edge 112 side to form one bend C so as to allow the connector 5 to be positioned at the second position (as shown in FIG. 34). And the two connector mounting portions 423 are mounted side by side with each other to the connector 5.

Figure 36:
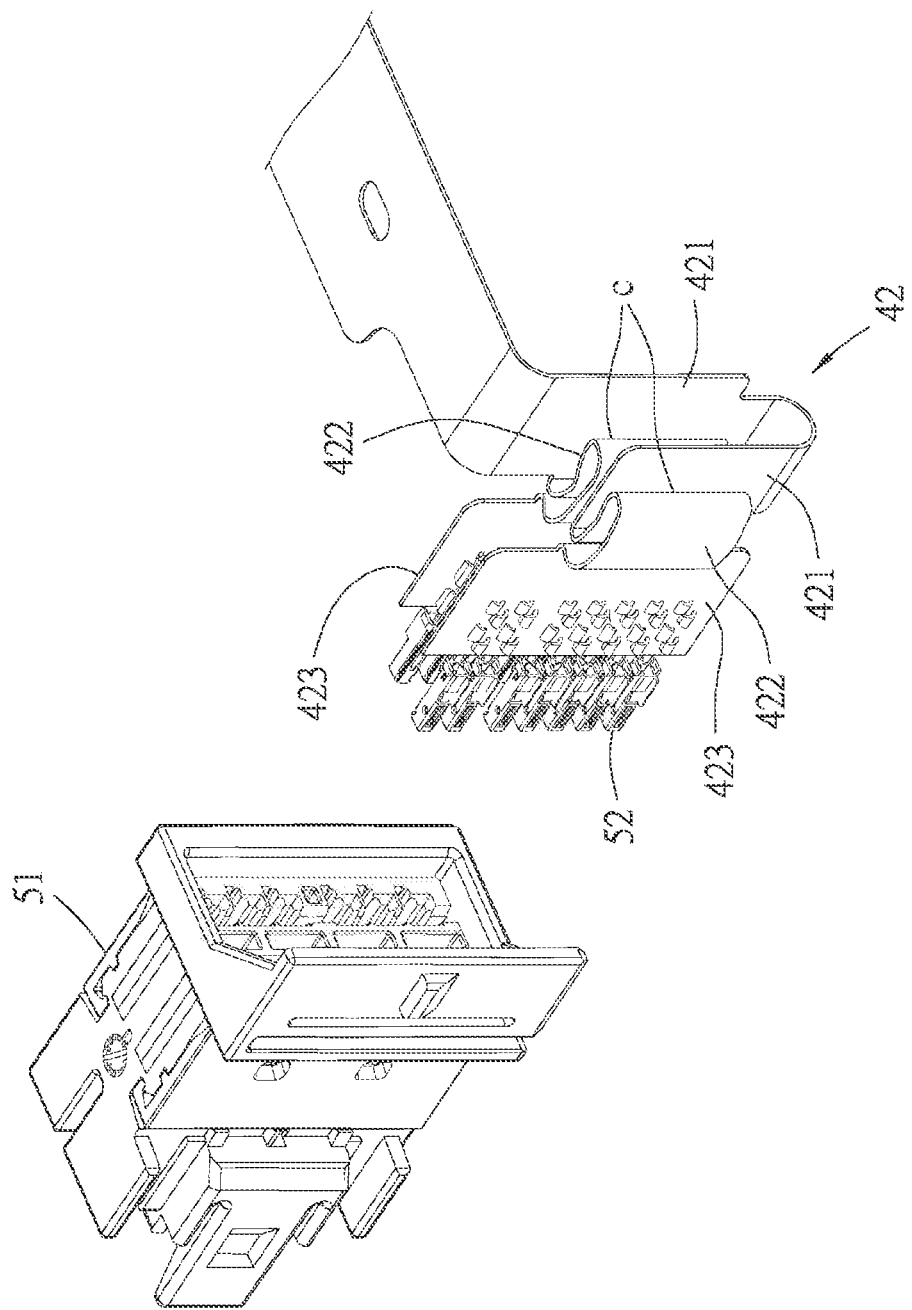
FIG. 36 is an incomplete exploded perspective view of the tenth embodiment and illustrates the bending state of the mounting bar of the flexible circuit piece when the connector is in the first position.
Figure 37:
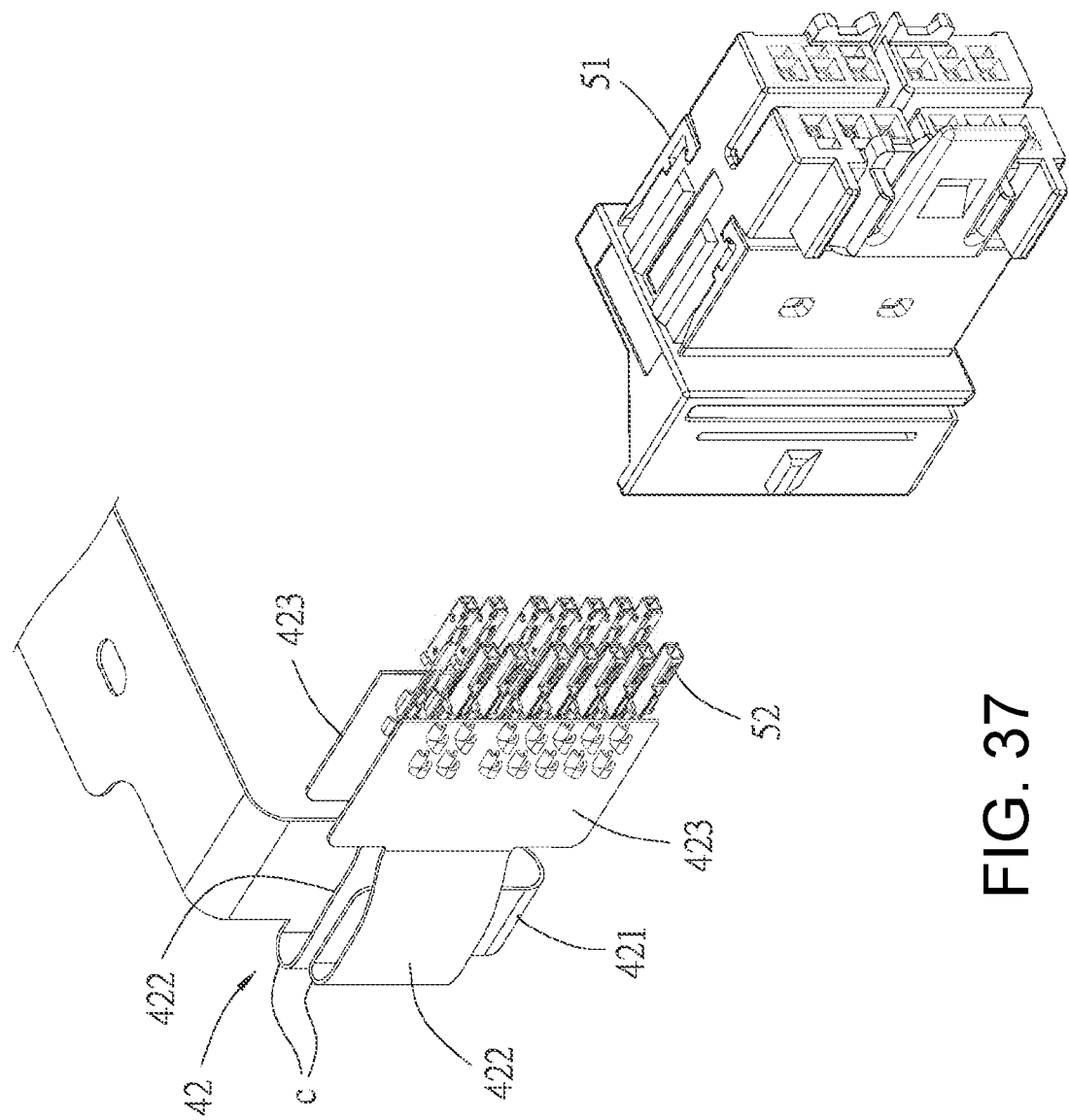
FIG. 37 is an incomplete exploded perspective view of the tenth embodiment and illustrates the bending state of the mounting bar of the flexible circuit piece when the connector is in the second position.
Figure 38:
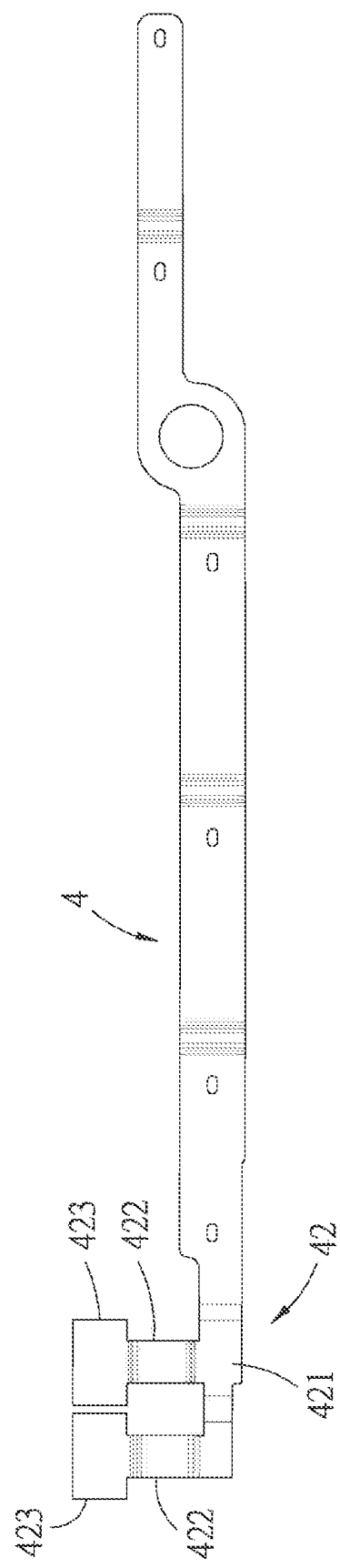
FIG. 38 is an unfolded schematic view of the flexible circuit piece of the tenth embodiment.

Referring to FIG. 35 to FIG. 38, a tenth embodiment of the battery connection module of the present disclosure differs from the first embodiment in that: the mounting bar 42 has two bendable portions 422, the two bendable portions 422 are spaced apart from each other and extend from the same side of the connecting portion 421 corresponding to the first edge 111, and the connecting portion 421 forms one bend so that the two bendable portions 422 face each other side by side, the distal ends of the two bendable portions 422 consist of the connector mounting portions 423 to provide the terminals 52, similarly, the terminals 52 and the insulating housing 51 are engaged to consist of the connector 5. The two bendable portions 422 each are operable to form at least two bends C (as shown in FIG. 36) so as to allow the connector 5 to be positioned at the first position; the two bendable portions 422 each are operable to form at least one bend C (as shown in FIG. 37) so as to allow the connector 5 to be positioned at the second position.

Figure 39:
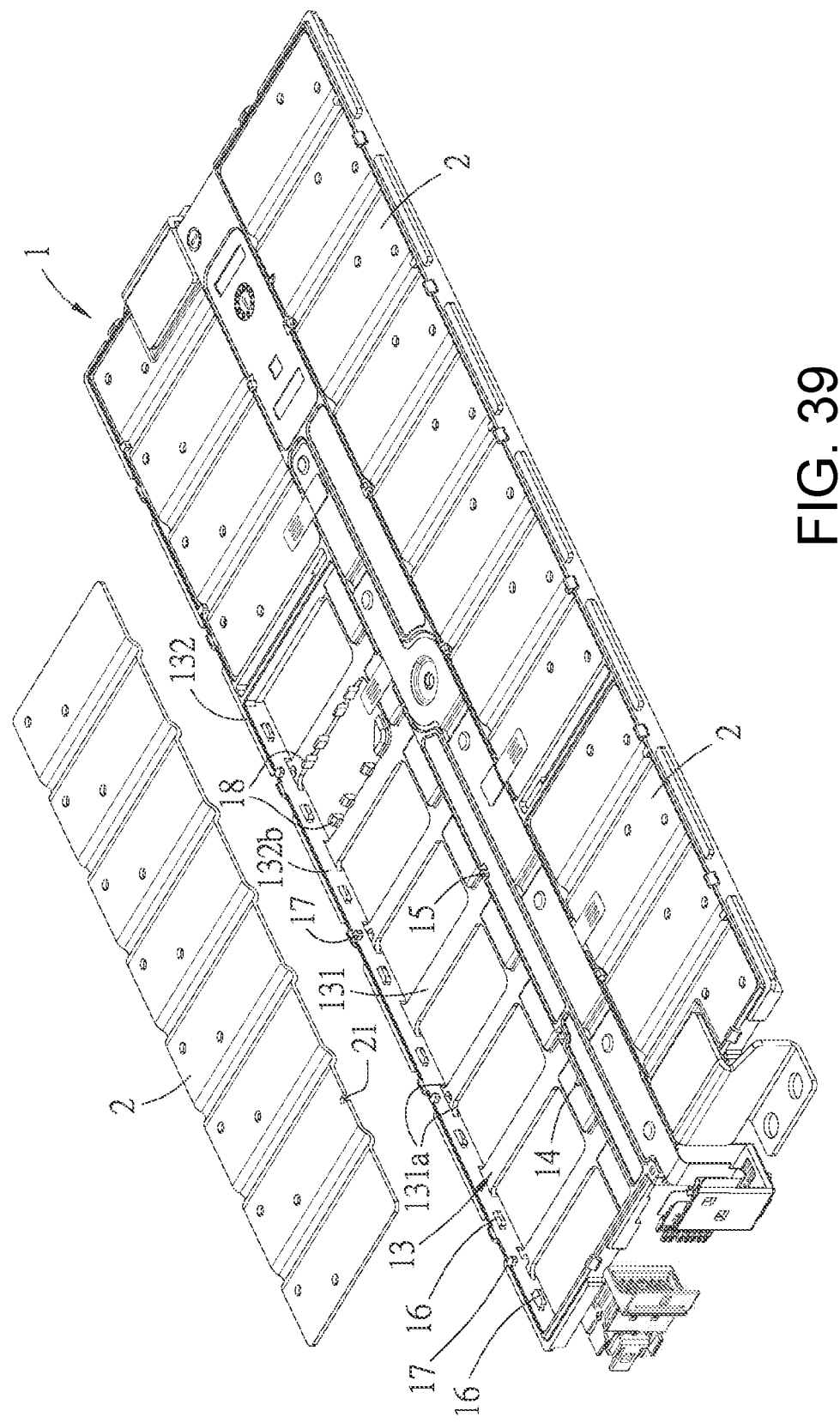
FIG. 39 is an exploded perspective view of the tenth embodiment and illustrates an assembling relationship of the busbars and the carrying tray.
Figure 40:
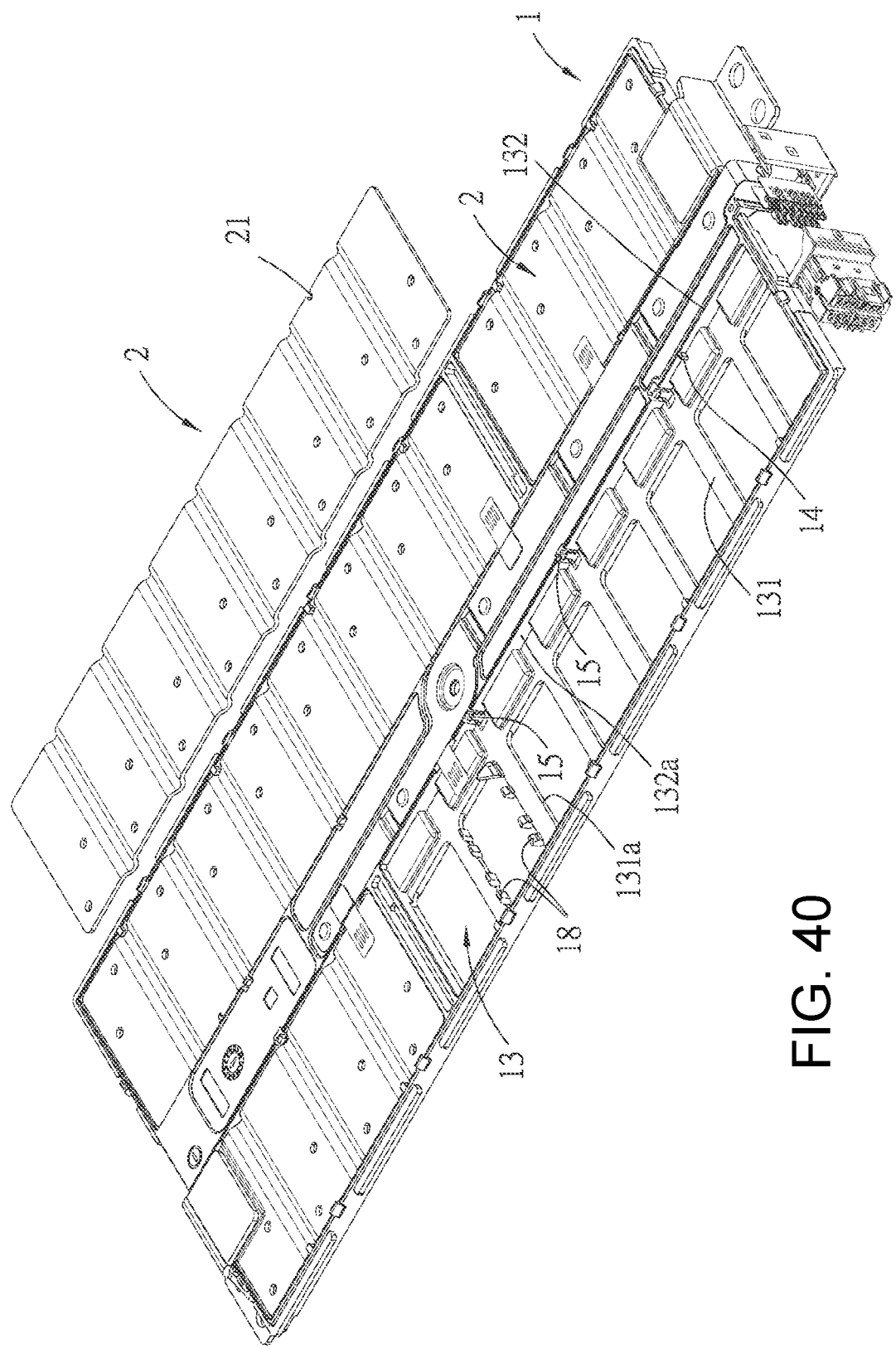
FIG. 40 is a view corresponding to FIG. 39 from another angle.
Figure 41:
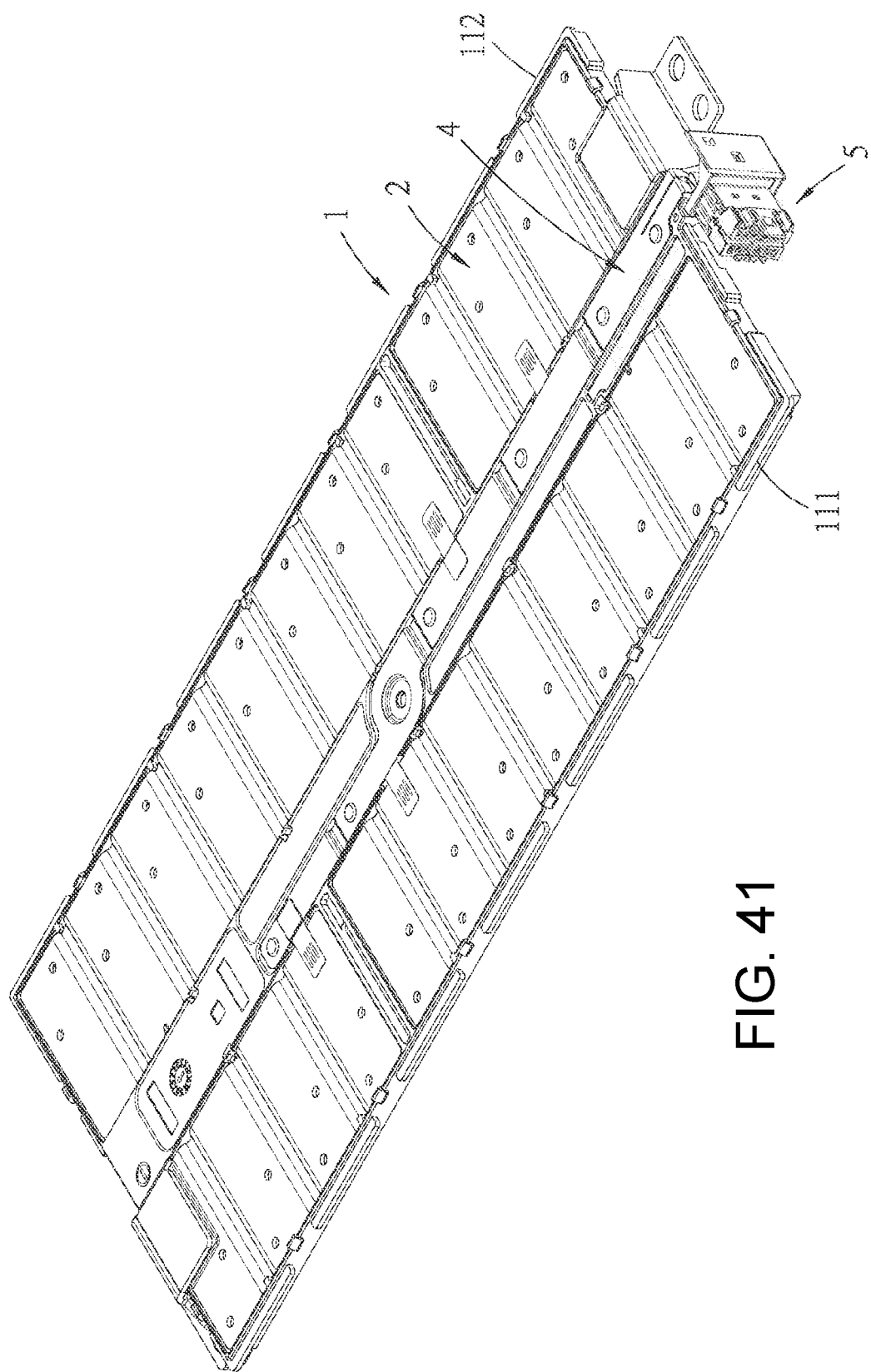
FIG. 41 is a perspective view of an eleventh embodiment of the battery connection module of the present disclosure.
Figure 44:
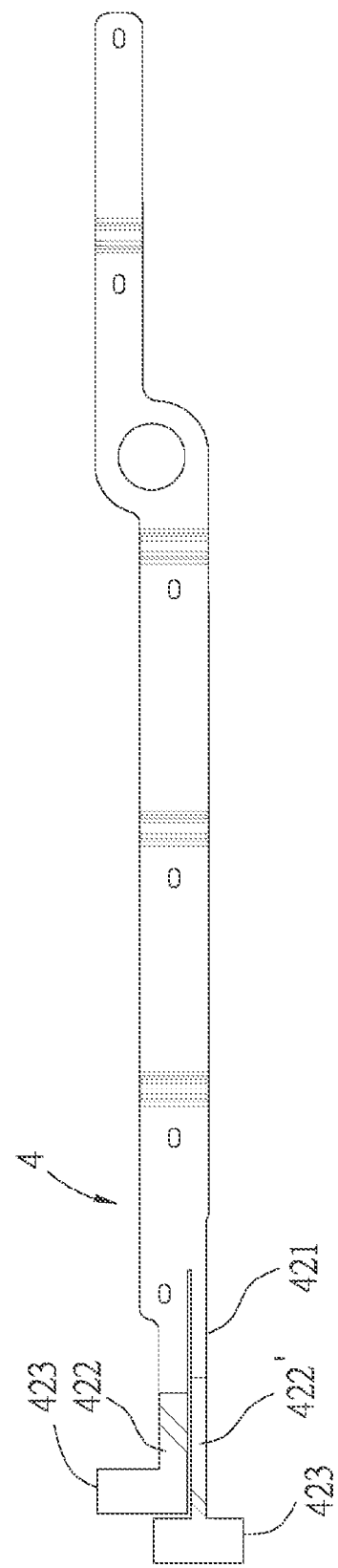
FIG. 44 is an unfolded schematic view of the eleventh embodiment of the flexible circuit piece.

In addition, referring to FIG. 39 and FIG. 40, the carrying tray 1 has a plurality of mounting grooves 13 respectively accommodating the plurality of busbars 2, and each mounting groove 13 is defined by a groove bottom wall 131 and a groove side wall 132. The groove bottom wall 131 is provided with a plurality of hollow portions 131a respectively corresponding to the batteries 71 (see FIG. 1), the groove side wall 132 is provided with an alignment key 14 protruding into the mounting groove 13, each busbar 2 has an alignment cutout 21 cooperating with the alignment key 14 in the corresponding mounting groove 13, so that the busbar 2 can be mounted in the correct position to prevent the reverse mount and realize fool-proof. Each groove side wall 132 has a first side wall portion 132a and a second side wall portion 132b which face each other, and the alignment key 14 is provided on the first side wall portion 132a, the first side wall portion 132a is further provided with at least one latching hook 15, the second side wall portion 132b is provided with a plurality of lower stopping blocks 16 positioned at a first height and a plurality of upper stopping blocks 17 positioned at a second height. The groove bottom wall 131 is provided with a plurality of support blocks 18, top ends of the plurality of support blocks 18 have the same height as top ends of the plurality of lower stopping blocks 16, the plurality of lower stopping blocks 16 and the plurality of support blocks 18 are cooperatively support the corresponding busbar 2, the plurality of upper stopping blocks 17 and the at least one latching hook 15 cooperatively limit the corresponding busbar 2 in position. One side of the busbar 2 is positioned between the plurality of upper stopping blocks 17 and the plurality of lower stopping blocks 16 and a height difference between the second height and the first height is greater than a thickness of the corresponding busbar 2, therefore the busbar 2 can float between the plurality of upper stopping blocks 17 and the plurality of lower stopping blocks 16 to facilitate welding with the electrodes of the batteries 71. That is, the plurality of busbars 2 are firstly mounted on the carrying tray 1, when the busbars 2 are assembled, it is first confirmed that the alignment cutout 21 of the busbar 2 corresponds to the alignment key 14 in position, then a side of the busbar 2 adjacent to the second side wall portion 132b is obliquely inserted between the plurality of upper stopping blocks 17 and the plurality of lower stopping blocks 16, then a side of the busbars 2 adjacent to the first side wall portion 132a is pressed downwardly to pass over a hook portion of the latching hook 15 so that the busbar 2 is limited in the mounting groove 13 in position. When the battery connection module is assembled with the battery pack 7 (see FIG. 1), because the busbar 2 can float up and down in the mounting groove 13, the busbar 2 and the electrodes of the batteries 71 can be easily adjusted in relative position such that the busbar 2 and the electrodes of the batteries 71 are easily welded together. The mounting structure of the aforementioned carrying tray 1 and the busbars 2 is also adapted to other embodiments of the present disclosure.

Referring to FIG. 41 to FIG. 44, an eleventh embodiment of the battery connection module of the present disclosure differs from the first embodiment in that: the mounting bar 42 has two bendable portions 422, 422', the connecting portion 421 is cut into two parts along an extending direction and the two bendable portions 422, 422' respectively extend from distal ends of the two parts of the connecting portion 421, one of the two bendable portions 422, 422' which is close to the first edge 111 is defined as a first bendable portion 422, and the other of the two bendable portions 422, 422' which is close to the second edge 112 is defined as a second bendable portion 422'. Distal ends of the two bendable portions 422, 422' consist of the connector mounting portions 423 to provide the terminals 52, similarly, the terminals 52 and the insulating housing 51 are engage with each other to consist of the connector 5. The first bendable portion 422 is operable to form at least one bend C and the second bendable portion 422' is operable to form at least one bend C (see FIG. 42) so as to allow the connector 5 to be positioned at the first position, in the embodiment, the first bendable portion 422 specifically form three bends to shorten the length; the first bendable portion 422 is operable to form at least one bend C and the second bendable portion 422' is operable to format least one bend C (see FIG. 43) so as to allow the connector 5 to be positioned at the second position.

In conclusion, because the mounting bar 42 of the flexible circuit piece 4 has the bendable portion 422 which is operable to bend so as to allow the operator to flexibly select that the connector 5 is positioned at the first position or the second position opposite to the first position to meet the use requirements, thereby, it is possible to save the cost of separately manufacturing the mold for the connector 5 at the different positions and the cost of the product inventory. Furthermore, the connector 5 can be fixed to one end of the carrying tray 1 by that the first latching structure 513 and the second latching structure 126 are latched with each other, so that the configuration of the entire battery connection module is more compact and the integration is better, and it facilitates that the mating connector is mated with the connector 5, and it can avoid damage to the flexible circuit piece 4 because the flexible circuit piece 4 is when the connector 5 is inserted or pulled out. Furthermore, by that the side cover 62 of the upper cover 6 at least covers the mounting bar 42 and the connection between the mounting bar 42 and the connector 5, the mounting bar 42 and the connection between the mounting bar 42 and the connector 5 can be protected from damage.

However, the above description is only for the embodiments of the present disclosure, and the scope of the present disclosure is not limited thereto, and all the simple equivalent changes and modifications according to the scope of the patent application and the patent specification of the present disclosure are still within the scope of the patent of the present disclosure.

What is claimed is:

1. A battery connection module, adapted to connect a battery pack, the battery connection module comprising:
   a carrying tray adapted to be provided on the battery pack and having a first edge and a second edge which are positioned at two opposite sides and two end edges which respectively connect two ends of the first edge and second edge;
   a plurality of busbars provided on the carrying tray and adapted to electrically connect the battery pack; and
   a circuit unit comprising a flat flexible circuit piece and a connector, the flat flexible circuit piece being mechanically and electrically connected to each busbar and having a main body and a mounting bar extending from the main body, the mounting bar having a connecting portion extending from the main body at a position corresponding to one of the end edges of the carrying tray and at least one bendable portion extending from the connecting portion, and a distal end of the at least one bendable portion consisting of a connector mounting portion, the connector being provided on the connector mounting portion and having a mating end which is adapted to mate with a mating connector, and the bendable portion being operable to allow the connector to be positioned at positions where the mating end faces different directions.

2. The battery connection module of claim 1, wherein the connector comprises an insulating housing and a plurality of terminals provided to the insulating housing, the plurality of terminals are connected to the connector mounting portion of the mounting bar, the connector further comprises an outer casing sheathed on the insulating housing.

3. The battery connection module of claim 1, wherein the carrying tray further has a seat body for accommodating the connector and the mounting bar.

4. The battery connection module of claim 3, wherein the seat body has a first sideward opening toward the first edge so as to allow the connector to be positioned at the first position and a second sideward opening toward the second edge so as to allow the connector to be positioned at the second position.

5. The battery connection module of claim 4, wherein
   the connector comprises an insulating housing, the insulating housing of the connector has a first latching structure,
   the seat body has a second latching structure for latching and fixing with the first latching structure.

6. The battery connection module of claim 5, wherein
   the insulating housing further has a bottom surface, the first latching structure is formed on the bottom surface,
   the seat body further has a connecting wall extending downwardly from the end edge of the carrying tray, a position-limiting wall spaced apart from and facing the connecting wall, a bottom wall connected between a lower edge of the connecting wall and a lower edge of the position-limiting wall, the second latching structure is formed on the bottom wall.

7. The battery connection module of claim 1, wherein the bendable portion is operable to allow the connector to be positioned at a first position where the mating end faces the first edge; and the bendable portion is operable to allow the connector to be positioned at a second position where the mating end faces the second edge.

8. The battery connection module of claim 7, wherein
   the mounting bar has two bendable portions, the two bendable portions respectively extend from two sides of the connecting portion which respectively correspond to the first edge and the second edge,
   the two bendable portions are operable to allow the bendable portion which is close to the first edge to form at least two bends and allow the bendable portion which is close to the second edge to form at least one bend, so as to allow the connector to be positioned at the first position;
   the two bendable portions are operable to allow the bendable portion which is close to the first edge to form at least one bend and allow the bendable portion which is close to the second edge to form at least two bends, so as to allow the connector to be positioned at the second position.

9. The battery connection module of claim 7, wherein
   the mounting bar has one bendable portion, the bendable portion extends from a lower end of the connecting portion,
   the bendable portion is operable to bend toward the first edge to form at least one bend so as to allow the connector to be positioned at the first position;

the bendable portion is operable to bend toward the second edge to form at least one bend so as to allow the connector to be positioned at the second position.

10. The battery connection module of claim 9, wherein
the bendable portion is operable to bend at an angle of 45 degrees toward the first edge to form one bend so as to allow the connector to be positioned at the first position;
the bendable portion is operable to bend at an angle of 45 degrees toward the second edge to form one bend so as to allow the connector to be positioned at the second position.

11. The battery connection module of claim 10, wherein the connector mounting portion is formed by a first mounting section connecting with the bendable portion, a second mounting section arranged side by side with the first mounting section and a connecting section curvedly connected between the first mounting section and the second mounting section.

12. The battery connection module of claim 7, wherein
the mounting bar has one bendable portion, the bendable portion extends sideward from a side of the connecting portion corresponding to the first edge,
the bendable portion is operable to form at least two bends so as to allow the connector to be positioned at the first position;
the bendable portion is operable to form at least one bend so as to allow the connector to be positioned at the second position.

13. The battery connection module of claim 12, wherein the connector mounting portion is formed by a first mounting section connecting with the bendable portion, a second mounting section arranged side by side with the first mounting section and a connecting section curvedly connected between the first mounting section and the second mounting section.

14. The battery connection module of claim 12, wherein the distal end of the bendable portion is layered to form two connector mounting portions arranged side by side with each other.

15. The battery connection module of claim 7, wherein
the mounting bar has one bendable portion, the bendable portion extends sideward from a side of the connecting portion corresponding to the second edge,
the bendable portion is operable to form at least one bend so as to allow the connector to be positioned at the first position;
the bendable portion does not turn and bend to allow the connector to be positioned at the second position.

16. The battery connection module of claim 15, wherein the bendable portion is operable to turn once toward the first edge and pass through an outer side of the connecting portion with respect to the carrying tray so as to allow the connector to be positioned at the first position.

17. The battery connection module of claim 15, wherein the bendable portion is operable to turn once toward the first edge and pass through an inner side of the connecting portion with respect to the carrying tray so as to allow the connector to be positioned at the first position.

18. The battery connection module of claim 15, wherein the connector mounting portion is formed by a first mounting section connecting with the bendable portion, a second mounting section arranged side by side with the first mounting section and a connecting section curvedly connected between the first mounting section and the second mounting section.

19. The battery connection module of claim 7, wherein
the connecting portion has a cutout,
the mounting bar has two bendable portions, the two bendable portions respectively bend from two sides of the connecting portion respectively corresponding to the first edge and the second edge toward an inner side of the connecting portion with respect to the carrying tray, then extend in facing each other, then bend toward an outer side of the connecting portion with respect to the carrying tray, merge and pass through the cutout;
the merged region of the two bendable portions is operable to form at least one bend so as to allow the connector to be positioned at the first position;
the merged region of the two bendable portions is operable to form at least one bend so as to allow the connector to be positioned at the second position.

20. The battery connection module of claim 19, wherein the two bendable portions are further separated at a distal end of the merged region to form two connector mounting portions.

21. The battery connection module of claim 7, wherein
the mounting bar has two bendable portions, the two bendable portions are spaced apart from each other and extend from the same side of the connecting portion corresponding to the first edge, and the connecting portion forms one bend so that the two bendable portions face each other side by side;
the two bendable portions each are operable to form at least two bends so as to allow the connector to be positioned at the first position;
the two bendable portions each are operable to form at least one bend so as to allow the connector to be positioned at the second position.

22. The battery connection module of claim 7, wherein
the mounting bar has two bendable portions, the connecting portion is cut into two parts along an extending direction and the two bendable portions respectively extend from distal ends of the two parts of the connecting portion, one of the two bendable portions which is close to the first edge is defined as a first bendable portion, the other of the two bendable portions which is close to the second edge is defined as a second bendable portion;
the first bendable portion is operable to form at least one bend and the second bendable portion is operable to form at least one bend so as to allow the connector to be positioned at the first position;
the first bendable portion is operable to form at least one bend and the second bendable portion is operable to format least one bend so as to allow the connector to be positioned at the second position.

23. The battery connection module of claim 1, wherein the connector comprises an insulating housing, the insulating housing of the connector has a bottom surface, the bottom surface has a first latching structure for latching and fixing with a second latching structure which is formed on a side wall top surface of a box body of the battery pack.

24. The battery connection module of claim 23, wherein
the second latching structure is formed by two protruding rails spaced apart from each other, each protruding rail has a rib portion extending parallel to the end edge of the carrying tray, an upper stopping portion extending from the rib portion 1261 toward a direction away from the other protruding rail and spaced apart from the side wall top surface and a latching block extending from the rib portion toward the other protruding rail, and one of the latching blocks of the two protruding rails is close to the first edge so as to allow the connector to latch when the connector is positioned at the first position, and the other of the latching blocks of the two protruding rails is close to the second edge so as to allow the connector to latch when the connector is positioned at the second position, the first latching structure is formed by two sliding rails spaced apart from each other in parallel and a hook portion positioned between the two sliding rails to cooperatively latch with one of the latching blocks, each of facing sides of the two sliding rails is formed with a position-limiting groove closed at one end to cooperatively accommodate the upper stopping portion of the corresponding protruding rail.

25. The battery connection module of claim 24, wherein the battery connection module further comprises an upper cover, the upper cover has a main cover which covers the carrying tray and a side cover connected to the main cover, the side cover at least covers the mounting bar connected to a rear end of the connector.

26. The battery connection module of claim 1, wherein the carrying tray has a plurality of mounting grooves respectively accommodating the plurality of busbars, and each mounting groove is defined by a bottom wall and a groove side wall, the groove side wall is provided with an alignment key protruding into the mounting groove, each busbar has an alignment cutout cooperating with the alignment key in the corresponding mounting groove.

27. The battery connection module of claim 26, wherein each groove side wall has a first side wall portion and a second side wall portion which face each other, and the alignment key is provided on the first side wall portion, the first side wall portion is further provided with at least one latching hook, the second side wall portion is provided with a plurality of lower stopping blocks positioned at a first height and a plurality of upper stopping blocks positioned at a second height, one side of the busbar is positioned between the plurality of upper stopping blocks and the plurality of lower stopping blocks and a height difference between the second height and the first height is greater than a thickness of the busbar, the groove bottom wall is provided with a plurality of support blocks, the top ends of plurality of support blocks have the same height as top ends of the plurality of lower stopping blocks, the plurality of lower stopping blocks and the plurality of support blocks are cooperatively support the busbar, the plurality of upper stopping blocks and the at least one latching hook cooperatively limit the busbar in position.

28. The battery connection module of claim 1, wherein the flexible circuit piece is a flexible flat cable.

29. The battery connection module of claim 1, wherein the flexible circuit piece is a flexible circuit board.

30. A battery connection module, adapted to connect a battery pack, the battery connection module comprising:

a carrying tray adapted to be provided on the battery pack, the carrying tray having a first edge, a second edge and two end edges, the first and second edges being positioned at opposite sides, the two end edges respectively connect two ends of the first edge and the second edge, the carrying tray having a seat body, the seat body having a first sideward opening toward the first edge and a second sideward opening toward the second edge, the seat body having a connecting wall, a position-limiting wall, a bottom wall, and a first latching structure, the connecting wall extending downwardly from one of the two end edges, the position-limiting wall being spaced apart from and facing the connecting wall, the bottom wall being connected between a lower edge of the connecting wall and a lower edge of the position-limiting wall, the first latching structure being formed on the bottom wall;

a plurality of busbars provided on the carrying tray, the plurality of busbars being adapted to electrically connect the battery pack; and a circuit unit comprising a flexible circuit piece and a connector, the flexible circuit piece being mechanically and electrically connected to each busbar, the flexible circuit piece having a main body and a mounting bar extending from the main body, the mounting bar having a connecting portion and at least one bendable portion, the connecting portion extending from the main body at a position corresponding to one of the end edges of the carrying tray, the at least one bendable portion extending from the connecting portion, the at least one bendable portion having a connector mounting portion at a distal end thereof, the connector comprising an insulating housing and being provided on the connector mounting portion, the insulating housing having a mating end which is adapted to mate with a mating connector, the insulating housing having a bottom surface and a second latching structure, the second latching structure being formed on the bottom surface, the connector and the mounting bar being accommodated by the seat body, wherein the first latching structure is latched and fixed with the second latching structure, wherein the at least one bendable portion is operable, and the first sideward opening is configured, to allow the connector to be positioned at a first position where the mating end faces the first edge, and wherein the at least one bendable portion is operable, and the second sideward opening is configured, to allow the connector to be positioned at a second position where the mating end faces the second edge.

31. The battery connection module of claim 30, wherein the first latching structure is formed by two protruding rails spaced apart from each other, each of the two protruding rails has a rib portion extending parallel to the end edge of the carrying tray, an upper stopping portion extending from the rib portion toward a direction away from the other protruding rail and spaced apart from the bottom wall and a latching block extending from the rib portion toward the other protruding rail, and one of the latching blocks of the two protruding rails is close to the first edge so as to allow the connector to latch when the connector is positioned at the first position, and the other of the latching blocks of the two protruding rails is close to the second edge so as to allow the connector to latch when the connector is positioned at the second position, the second latching structure is formed by two sliding rails spaced apart from each other in parallel and a hook portion positioned between the two sliding rails to cooperatively latch with one of the latching blocks, each of facing sides of the two sliding rails is formed with a position-limiting groove closed at one end to cooperatively accommodate the upper stopping portion of the corresponding protruding rail.

32. The battery connection module of claim 30, wherein the battery connection module further comprises an upper cover, the upper cover has a main cover which covers the carrying tray and a side cover which is connected to the main cover and covers the seat body.

33. The battery connection module of claim 32, wherein the side cover has at least one latching hook, and the position-limiting wall of the seat body is formed with at least one latching hole to allow the at least one latching hook to latch therewith.

34. A battery connection module, adapted to connect a battery pack, the battery connection module comprising:
- a carrying tray adapted to be provided on the battery pack, the carrying tray having a first edge, a second edge and two end edges, the first and second edges being positioned at opposite sides, the two end edges respectively connect two ends of the first edge and the second edge;
- a plurality of busbars provided on the carrying tray, the plurality of busbars being adapted to electrically connect the battery pack; and
- a circuit unit comprising a flexible circuit piece and a connector, the flexible circuit piece being mechanically and electrically connected to each busbar, the flexible circuit piece having a main body and a mounting bar extending from the main body, the mounting bar having a connecting portion and first and second bendable portions, the connecting portion extending from the main body at a position corresponding to one of the end edges of the carrying tray, the first bendable portion extending toward the first edge from the connecting portion, the second bendable portion extending toward the second edge from the connecting portion, each bendable portion having a connector mounting portion at a distal end thereof, the connector being provided on the connector mounting portion of each bendable portion, the connector having a mating end which is adapted to mate with a mating connector, wherein, so as to allow the connector to be positioned at a first position where the mating end faces the first edge, the first bendable portion is operable to form at least two bends and the second bendable portion is operable to form at least one bend, and wherein, so as to allow the connector to be positioned at a second position where the mating edge faces the second edge, the first bendable portion is operable to form at least one bend and the second bendable portion is operable to form at least two bends.

* * * * *